(12) United States Patent
Chan et al.

(10) Patent No.: US 11,853,032 B2
(45) Date of Patent: Dec. 26, 2023

(54) COMBINING MACHINE LEARNING WITH DOMAIN KNOWLEDGE AND FIRST PRINCIPLES FOR MODELING IN THE PROCESS INDUSTRIES

(71) Applicant: AspenTech Corporation, Bedford, MA (US)

(72) Inventors: Willie K. C. Chan, Framingham, MA (US); Benjamin Fischer, Winchester, MA (US); Hernshann Chen, Sudbury, MA (US); Ashok Ramanath Bhakta, Franklin, MA (US); Parham Mobed, Lowell, MA (US)

(73) Assignee: AspenTech Corporation, Bedford, MA (US)

( * ) Notice: Subject to any disclaimer, the term of this patent is extended or adjusted under 35 U.S.C. 154(b) by 534 days.

(21) Appl. No.: 16/868,183

(22) Filed: May 6, 2020

(65) Prior Publication Data
US 2020/0379442 A1 Dec. 3, 2020

Related U.S. Application Data

(60) Provisional application No. 62/845,686, filed on May 9, 2019.

(51) Int. Cl.
*G05B 19/4155* (2006.01)
*G06N 20/00* (2019.01)
(Continued)

(52) U.S. Cl.
CPC ...... *G05B 19/4155* (2013.01); *B01J 19/0033* (2013.01); *G06N 5/04* (2013.01);
(Continued)

(58) Field of Classification Search
CPC ............... G06N 5/04; B01J 19/0033; B01J 2219/00243; G05B 19/4155; G05B 17/02; G05B 13/027; G05B 2219/32287
See application file for complete search history.

(56) References Cited

U.S. PATENT DOCUMENTS

| 5,301,101 A | 4/1994 | Macarthur et al. |
| 5,410,634 A | 4/1995 | Li |

(Continued)

FOREIGN PATENT DOCUMENTS

| CN | 106600000 A | 4/2017 |
| CN | 107430398 A | 12/2017 |

(Continued)

OTHER PUBLICATIONS

Hussein, "Adaptive Artificial Neural Network-Based Models for Instantaneous Power Estimation Enhancement in Electric Vehicles' Li-Ion Batteries", IEEE Transactions On Industry Applications, vol. 55, No. 1, Jan. 1, 2019, 840-849, XP011700440.

(Continued)

*Primary Examiner* — Shogo Sasaki
(74) *Attorney, Agent, or Firm* — Hamilton, Brook, Smith & Reynolds, P.C.

(57) ABSTRACT

Computer-based process modeling and simulation methods and systems combine first principles models and machine learning models to benefit where either model is lacking. In one example, input values (measurements) are adjusted by first principles techniques. A machine learning model of the chemical process of interest is trained on the adjusted values. In another example, a machine learning model represents the residual (delta) between a first principles model prediction and empirical data. Residual machine learning models correct physical phenomena predictions in a first principles model of the chemical process. In another example, a first principles simulation model uses the process input data and (Continued)

predictions of the machine learning model to generate simulated results of the chemical process. The hybrid models enable a process engineer to troubleshoot the chemical process, enable debottlenecking the chemical process, enable optimizing performance of the chemical process at the subject industrial plant, and enable automated process control.

22 Claims, 17 Drawing Sheets

(51) Int. Cl.
  *B01J 19/00* (2006.01)
  *G06N 5/04* (2023.01)
(52) U.S. Cl.
  CPC ..... *G06N 20/00* (2019.01); *B01J 2219/00243* (2013.01); *G05B 2219/32287* (2013.01)

(56) References Cited

U.S. PATENT DOCUMENTS

| | | | |
|---|---|---|---|
| 5,640,491 | A | 6/1997 | Bhat et al. |
| 5,682,309 | A | 10/1997 | Bartusiak et al. |
| 6,056,781 | A | 5/2000 | Wassick et al. |
| 6,088,630 | A | 7/2000 | Cawlfield |
| 6,819,964 | B2 | 11/2004 | Harmse |
| 6,937,966 | B1 | 8/2005 | Hellerstein et al. |
| 7,050,863 | B2 | 5/2006 | Mehta et al. |
| 7,085,615 | B2 | 8/2006 | Persson et al. |
| 7,194,317 | B2 | 3/2007 | Kothare et al. |
| 7,209,793 | B2 | 4/2007 | Harmse et al. |
| 7,213,007 | B2 | 5/2007 | Grichnik |
| 7,257,501 | B2 | 8/2007 | Zhan et al. |
| 7,330,804 | B2 | 2/2008 | Turner et al. |
| 7,421,374 | B2 | 9/2008 | Zhan et al. |
| 8,295,952 | B2 | 10/2012 | Macarthur et al. |
| 8,296,070 | B2 | 10/2012 | Paxson et al. |
| 8,560,092 | B2 | 10/2013 | Zheng et al. |
| 8,755,940 | B2 * | 6/2014 | Lou .................. F23C 10/28 422/115 |
| 8,762,301 | B1 | 6/2014 | Buckbee, Jr. |
| 9,046,881 | B2 | 6/2015 | Blevins et al. |
| 9,046,882 | B2 * | 6/2015 | Bartee .................. C12M 21/12 |
| 9,141,911 | B2 | 9/2015 | Zhao |
| 9,367,804 | B1 | 6/2016 | Moon et al. |
| 9,513,610 | B2 | 12/2016 | Zheng et al. |
| 9,535,808 | B2 | 1/2017 | Bates |
| 9,727,035 | B2 | 8/2017 | Keenan et al. |
| 10,031,510 | B2 | 7/2018 | Zhao et al. |
| 10,114,367 | B2 | 10/2018 | Bates |
| 10,739,752 | B2 | 8/2020 | Zhao et al. |
| 10,990,067 | B2 | 4/2021 | Modi et al. |
| 11,630,446 | B2 | 4/2023 | Andreu et al. |
| 11,754,998 | B2 | 9/2023 | Zhao et al. |
| 11,782,401 | B2 | 10/2023 | Keenan et al. |
| 2001/0051862 | A1 | 12/2001 | Ishibashi et al. |
| 2003/0220828 | A1 | 11/2003 | Iwang et al. |
| 2004/0153804 | A1 | 8/2004 | Blevins et al. |
| 2004/0249481 | A1 | 12/2004 | Zheng et al. |
| 2005/0010369 | A1 | 1/2005 | Varpela et al. |
| 2005/0096872 | A1 | 5/2005 | Blevins et al. |
| 2005/0240382 | A1 | 10/2005 | Nakaya et al. |
| 2006/0079983 | A1 | 4/2006 | Willis |
| 2006/0136138 | A1 | 6/2006 | Hicklin et al. |
| 2007/0225835 | A1 | 9/2007 | Zhu |
| 2008/0183311 | A1 | 7/2008 | Macarthur et al. |
| 2009/0222108 | A1 | 9/2009 | Lou et al. |
| 2010/0049369 | A1 | 2/2010 | Lou et al. |
| 2011/0066299 | A1 | 3/2011 | Gray et al. |
| 2011/0130850 | A1 | 6/2011 | Zheng et al. |
| 2011/0320386 | A1 | 12/2011 | Liano et al. |
| 2012/0003623 | A1 | 1/2012 | Bartee et al. |
| 2012/0004893 | A1 | 1/2012 | Vaidyanathan et al. |
| 2012/0084400 | A1 | 4/2012 | Almadi et al. |
| 2012/0173004 | A1 | 7/2012 | Radl |
| 2012/0221124 | A1 | 8/2012 | Thiele et al. |
| 2013/0151179 | A1 | 6/2013 | Gray |
| 2013/0151212 | A1 | 6/2013 | Gray et al. |
| 2013/0191106 | A1 | 7/2013 | Kephart et al. |
| 2013/0246316 | A1 | 9/2013 | Zhao et al. |
| 2013/0338842 | A1 | 12/2013 | Inoue et al. |
| 2014/0114598 | A1 | 4/2014 | Almadi et al. |
| 2014/0115121 | A1 | 4/2014 | Almadi et al. |
| 2015/0261200 | A1 | 9/2015 | Blevins et al. |
| 2016/0018796 | A1 | 1/2016 | Lu |
| 2016/0018797 | A1 | 1/2016 | Lu |
| 2016/0171414 | A1 | 6/2016 | Lee |
| 2016/0260041 | A1 | 9/2016 | Horn et al. |
| 2016/0320768 | A1 | 11/2016 | Zhao |
| 2017/0308802 | A1 | 10/2017 | Ramsøy et al. |
| 2018/0019910 | A1 | 1/2018 | Tsagkaris et al. |
| 2018/0060738 | A1 | 3/2018 | Achin et al. |
| 2018/0157225 | A1 | 6/2018 | Dave et al. |
| 2018/0299862 | A1 | 10/2018 | Zhao et al. |
| 2018/0299875 | A1 | 10/2018 | Mariswamy et al. |
| 2018/0341252 | A1 | 11/2018 | Lu |
| 2018/0348717 | A1 | 12/2018 | Zhao et al. |
| 2019/0095816 | A1 | 3/2019 | Lee et al. |
| 2019/0101902 | A1 | 4/2019 | Sayyarrodsari et al. |
| 2019/0102352 | A1 | 4/2019 | Sayyarrodsari et al. |
| 2019/0102360 | A1 | 4/2019 | Sayyarrodsari et al. |
| 2019/0102657 | A1 | 4/2019 | Sayyarrodsari et al. |
| 2019/0179271 | A1 | 6/2019 | Modi et al. |
| 2019/0188584 | A1 | 6/2019 | Rao et al. |
| 2019/0197403 | A1 | 6/2019 | Schmidhuber |
| 2019/0236447 | A1 | 8/2019 | Cohen et al. |
| 2020/0103838 | A1 | 4/2020 | Bertinetti et al. |
| 2020/0133210 | A1 | 4/2020 | Zheng |
| 2020/0175374 | A1 | 6/2020 | Hestness et al. |
| 2020/0242483 | A1 | 7/2020 | Shashikant Rao et al. |
| 2020/0257969 | A1 | 8/2020 | Goloubew et al. |
| 2020/0258157 | A1 | 8/2020 | Law |
| 2020/0387818 | A1 | 12/2020 | Chan et al. |
| 2021/0034023 | A1 | 2/2021 | Keenan et al. |
| 2021/0116891 | A1 | 4/2021 | Zhao et al. |
| 2022/0260980 | A1 | 8/2022 | Andreu et al. |

FOREIGN PATENT DOCUMENTS

| | | |
|---|---|---|
| EP | 2596613 A2 | 5/2013 |
| EP | 2682914 A1 | 1/2014 |
| EP | 2933976 A1 | 10/2015 |
| EP | 2825920 B1 | 1/2021 |
| GB | 2394564 A | 4/2004 |
| GB | 2409293 A | 6/2005 |
| JP | 06-028009 A | 2/1994 |
| JP | 06-083427 A | 3/1994 |
| JP | 06-187004 A | 7/1994 |
| JP | 09-212207 A | 8/1997 |
| JP | 2002-329187 A | 11/2002 |
| JP | 2004-199655 A | 7/2004 |
| JP | 2004-199656 A | 7/2004 |
| JP | 2005-202934 A | 7/2005 |
| JP | 2008-135010 A | 6/2008 |
| JP | 2009-509217 A | 3/2009 |
| JP | 2009-516301 A | 4/2009 |
| JP | 2010-170586 A | 8/2010 |
| JP | 2011-054163 A | 3/2011 |
| JP | 2013535730 A | 7/2011 |
| JP | 2012-089155 A | 5/2012 |
| JP | 2012-256366 A | 12/2012 |
| JP | 2013-012218 A | 1/2013 |
| JP | 2019-021186 A | 2/2019 |
| JP | 2019521444 A | 7/2019 |
| JP | 2021101388 A | 7/2021 |
| WO | 99/26118 A1 | 5/1999 |
| WO | 00/20939 A1 | 4/2000 |
| WO | 02/05042 A2 | 1/2002 |
| WO | 2008/119008 A1 | 10/2008 |
| WO | 2012012723 A2 | 7/2011 |
| WO | 2012118067 A1 | 2/2012 |
| WO | 2013/119665 A1 | 8/2013 |

(56) References Cited

FOREIGN PATENT DOCUMENTS

| WO | 2013170041 A2 | 11/2013 |
|---|---|---|
| WO | 2015149928 A2 | 10/2015 |
| WO | 2016093960 A1 | 6/2016 |
| WO | 2018009546 A1 | 1/2018 |
| WO | 2018075995 A1 | 4/2018 |
| WO | 2018223000 A1 | 12/2018 |
| WO | 2019/086760 A1 | 5/2019 |
| WO | 2020/091942 A1 | 5/2020 |
| WO | 2020227383 A1 | 11/2020 |
| WO | 2020247204 A1 | 12/2020 |
| WO | 2021/025841 A1 | 2/2021 |
| WO | 2021076760 A1 | 4/2021 |

OTHER PUBLICATIONS

Potocnik P, et al, "Neural Net Based Hybrid Modeling of the Methanol Synthesis Process", Neural Processing Letters, Kluwer Academic Publishers, No. 3, Jan. 1, 2000, 219-228. XP000949966.

Yang, et al, "An integrated multi-task control system for fuel-cell power plants", Decision and Control and European Control Conference (CDC-ECC), 2011 50th IEEE Conference, Dec. 12, 2011, 2988-2993.

International Search Report and Written Opinion for PCT/US2020/031636 dated Jul. 15, 2020, entitled "Combining Machine Learning With Domain Knowledge And First Principles For Modeling In The Process Industries".

International Search Report and Written Opinion for PCT/US2020/034530 dated Jul. 24, 2020, entitled "Asset Optimization Using Integrated Modeling, Optimization, and Artificial Intelligence".

Bhutani, N., et al., "First-Principles, Data-Based, and Hybrid Modeling and Optimization of an Industrial Hydrocracking Unit," Ind. Eng. Chem. Res., 45 (23), pp. 7807-7816 (2006).

Fair, J.R. and Mathews, R.L., "How to predict sieve tray entrainment and flooding," Petro/Chem Engineer 33(10), p. 45, 1961.

Hebert, D., "First-Principle Vs Data-Driven Models—Cost and the Time and Skill Required to Develop an Application-Specific Model have Been Barriers to Using First-Principle Modeling Tools," http://www.controlglobal.com/articles/2008/200/ (2008).

http://web.maths.unsw.edu.au/~fkuo/sobol/ (2010).

S. Joe and F. Y. Kuo, Remark on Algorithm 659: Implementing Sobol's quasirandom sequence generator, ACM Trans. Math. Softw. 29, 49-57 (2003).

Kister, Distillation Operation (Mechanical-Engineering), Bookmart Press, Inc., p. 376, 1990.

Kister, H.Z. and Haas, J.R., "Predict entrainment flooding on sieve and valve trays," Chemical Engineering Progress, 86(9), p. 63, 1990.

Machine Learning in Python, http://dl.acm.org/citation.cfm?id=2078195 (2011).

Pantelides C. C, et al., "The online use of first-principles models in process operations: Review, current status and future needs", Computers & Chemical Engineering, vol. 51, ISSN: 0098-1354, pp. 136-148 (2013).

Rakthanmanon, "Searching and Mining Trillions of Time Series Subsequences under Dynamic Time Warping," the 18th ACM SIGKDD Conference on Knowledge discovery and Data Mining, Aug. 12-16, 2012.

Random Forest Regressor, http://scikit-learn.org/stable/modules/generated/sklearn.ensemble. RandomForestRegressor.html (2010).

Silver D, et. al. "Mastering the game of Go with deep neural networks and tree search," Nature. 2016; 529:484-489.

Silver, D., et al. "Mastering chess and shogi by self-play with a general reinforcement learning algorithm", arXiv:1712.01815v1 [cs.AI] Dec. 5, 2017.

Venkatasubramanian, V., "The Promise of Artificial Intelligence in Chemical Engineering: Is It Here, Finally?" AIChE Journal, vol. 65-2, pp. 467-479 (Dec. 19, 2018).

International Search Report and Written Opinion for PCT/US2017/040725 dated Oct. 16, 2017., entitled "Computer System And Method For The Dynamic Construction And Online Deployment Of An Operation-Centric First-Principles Process Model For Predictive Analytics".

European Search Report Application No. 17 751 159.9, entitled "Computer System And Method For The Dynamic Construction And Online Deployment Of An Operation-Centric First-Principles Process Model For Predictive Analytics." dated Jan. 21, 2020.

Brill, et al., "Transportation of liquids in multiphase pipelines under low liquid loading conditions." Ph.D. Dissertation, The University of Tulsa (1995).

Caetano, "Upward vertical two-phase flow through an annulus." Ph.D. Dissertation, The University of Tulsa (1985).

Psichogios, D.C. and Ungar, L. H., "A Hybrid Neural Network-First Principles Approach to Process Modeling", AIChE Journal, 38: 1499-1511 (1992).

Yang, "A study of intermittent flow in downward inclined pipes." Ph.D. Dissertation, The University of Tulsa (1996).

Zendehboudi, S., Rezaei, N., and Lohi, A., "Applications of hybrid models in chemical, petroleum, and energy systems: A systematic review", Applied Energy, 228: 2539-2566 (2018).

Zhang, H. Q., Q. Wang, C. Sarica, and J. P. Brill, "Unified model for gas-liquid pipe flow via slug dynamics-Part 1: Model development", Trans. Of the ASME, 25: 266-273 (2003).

Zhang, H. Q., Q. Wang, C. Sarica, and J. P. Brill, "Unified model for gas-liquid pipe flow via slug dynamics-Part 2: Model validation", Trans. Of the ASME, 25: 274-283 (2003).

U.S. Appl. No. 16/434,793, filed Jun. 7, 2019, titled: "Asset Optimization Using Integrated Modeling, Optimization, and Artificial Intelligence" to Willie K. C. Chan et al.

International Search Report and Written Opinion for PCT/US2020/055787 dated Jan. 29, 2021, entitled "System And Methods For Automated Model Development From Plant Historical Data For Advanced Process Control".

Tay et al., "Reluctant generalized additive modeling," Department of Statistics, and Department of Biomedical Data Science, Stanford University, Jan. 15, 2020, 20 pages.

Yu et al., "Reluctant Interaction Modeling," Department of Statistics, University of Washington, Seattle, Washington, 98105, Jul. 22, 2019, 32 pages.

International Preliminary Report on Patentability for PCT/US2020/031636 dated Nov. 18, 2021, 11 pages.

International Preliminary Report on Patentability for PCT/US2020/034530 dated Dec. 16, 2021, 8-pages.

International Search Report and Written Opinion received for PCT Patent Application No. PCT/US2020/042239, dated Oct. 14, 2020, 10 pages.

Mohamed, et al., "A Neural-Network-Based Model Predictive Control of Three-Phase Inverter with an Output LC Filter," Cornell University Library, ArXiv:1902.099643v3, XP081457097, whole document, Feb. 22, 2019.

Qin, et al., "A Survey of Industrial Model Predictive Control Technology", Control Engineering Practice 11 (2003).

Soliman, M., "Multiple Model Predictive Control for Wind Turbines with Doubly Fed Induction Generators," IEEE Transactions on Sustainable Energy, vol. 2, No. 3, pp. 215-225 (2011).

Zhao, et al., "An Identification Approach to Nonlinear State Space Model for Industrial Multivariable Model Predictive Control," Proceedings of the American Control Conference, Philadelphia, PA, Jun. 1998.

International Preliminary Report on Patentability received for PCT Patent Application No. PCT/US2020/055787, dated Apr. 28, 2022, 7 pages.

International Preliminary Report on Patentability received for PCT Patent Application No. PCT/US2020/042239, dated Feb. 17, 2022, 8 pages.

Fellini, R., et al., "Optimal design of automotive hybrid powertrain systems," Proceedings First International Symposium on Environmentally Conscious Design and Inverse Manufacturing, IEEE, pp. 400-405 (1999).

Moraru, I.I., et al., "Virtual Cell modelling and simulation software environment," IET System Biology, vol. 2, No. 5, pp. 352-362 (Sep. 2008).

(56) References Cited

OTHER PUBLICATIONS

Wetter, M., "A view on future building system modeling and simulation." Building performance simulation for design and operation. Routledge, pp. 631-656. (Year: 2019).

* cited by examiner

COMBINING MACHINE LEARNING WITH DOMAIN KNOWLEDGE AND FIRST PRINCIPLES FOR MODELING IN THE PROCESS INDUSTRIES

RELATED APPLICATION(S)

This application claims the benefit of U.S. Provisional Application No. 62/845,686, filed on May 9, 2019. The entire teachings of the above application(s) are incorporated herein by reference.

BACKGROUND

In current process modeling and simulation practices, theoretical "full-scale" first-principles models are used for offline simulation such as plant design and debottlenecking as well as for online applications like monitoring and optimization. These "full-scale" models may consist of thousands to millions of mathematical equations representing physical and chemical properties as well as mass and energy balances in a chemical process under consideration. In many cases, these full-scale models may not capture all of the physical phenomena as the mechanisms cannot be described mathematically or as simplifications are necessary for a tractable solution.

Calibration and online execution of such a "full-scale" model are very challenging in terms of cost and sustainability, which has heavily limited the applications in the process industry. Simplifying and automating the incorporation of data into models as well as the sustainment of the model with new data can improve significantly the operation and optimization of the asset.

SUMMARY

Applicant's approach in the present invention is directed at a new paradigm for modeling and simulation of industrial chemical processes by combining first principles knowledge with machine learning techniques.

In one embodiment of the present invention, a computer-implemented method, system and/or computer program product: (1) generate a list of features based on first principles knowledge of chemical processes to augment or transform input measurements, and (2) generate a machine learning model that translates these inputs into a desired output.

The computer-implemented method of process modeling and simulation comprises the steps of: (a) modeling (generating a model of) a chemical process of a subject industrial plant, and (b) based on predictions made by the generated model, improving (or enabling improvement in) performance of the chemical process at the subject industrial plant. The step of modeling is automated and implemented by a processor including generating a model that predicts progress (e.g., operating conditions, physical properties, etc.) of the chemical process. The generated model includes a hybrid model formed of a first principles model having at least one element enhanced by a machine learning model of the chemical process. Embodiments improve performance of the chemical process by any of: enabling a process engineer to troubleshoot the chemical process, enabling and performing debottlenecking of the chemical process or portion(s) thereof, and optimizing performance of the chemical process at the subject industrial plant. In one embodiment, the step of improving performance of the chemical process includes: automatically controlling settings of equipment of the subject industrial plant based on predictions made by the generated model. Such an embodiment implements process control.

Likewise, a computer-implemented process modeling and simulation system comprises: a modeling subsystem, and an interface. The modeling subsystem generates the model of the chemical process of interest. The interface is coupled to the modeling subsystem in a manner that enables improvements in performance of the chemical process at the subject industrial plant based on predictions made by the generated model. The generated model includes a hybrid model formed of a first principles model having at least one element enhanced by a machine learning model of the chemical process. The interface enables improved performance of the chemical process by any of: enabling a process engineer to troubleshoot the chemical process, enabling debottlenecking of the chemical process, and optimizing performance of the chemical process at the subject industrial plant. In some embodiments the modeling subsystem is a modeling assembly, unit, engine, or the like.

In one embodiment implementing process control, the interface is or includes a controller interface. The controller interface communicatively couples the modeling subsystem and a controller of a subject industrial plant. The controller (via the controller interface) is responsive to predictions made by the generated model, and automatically controls settings of equipment of the subject industrial plant. The generated model includes a hybrid model formed of a first principles model having at least one element enhanced by a machine learning model of the chemical process.

In an embodiment, the one element enhanced by a machine learning model is an input variable based on plant data. The values of the input variable are augmented in training and developing the machine learning model.

In embodiments, the computer-implemented method and system further comprise steps of or configured modules: (c) generating a dataset of variables based on first principles (based on thermodynamic and chemical engineering domain knowledge) that augment original measured input variables from plant data, said generating resulting in augmented variables; and (d) using the original input variables combined with the augmented variables in training the machine learning model. The trained machine learning model produces a corresponding output variable dataset with enhanced accuracy.

In some embodiments, the one element enhanced by a machine learning model is a measurement of a physical property of the chemical process. The machine learning model prediction of the measurement of the physical property is used instead of the first principles model prediction of the physical property.

In embodiments, the computer-implemented method and system further comprises the step of or a configured module calculating a predicted value for output from a simulator, the first principles model forming the simulator. The method/system trains and develops the machine learning model to represent differences between observed output variable values from plant data and corresponding output variable values predicted by the simulator.

In some embodiments, the one element enhanced by a machine learning model is a quantitative representation of a physical property or phenomena for which there is no known measurement in plant data for use in the first principles model. The machine learning model prediction of measurements of the physical property or phenomena is used in the first principles model.

In some embodiments, the first principles model is a simulation model, and the method/system further comprises:
configuring the machine learning model to calculate (estimate, approximate, quantitatively represent, or otherwise compute) an unmeasurable simulation model parameter or function value of the chemical process;
utilizing the calculated model parameter or function value as an input into the simulation model;
computing error of output of the simulation model relative to measured output from plant data; and training the machine learning model using the computed error.

In another embodiment of the present invention, computer-based methods, systems, and computer program products provide automated mechanisms to generate a machine learning model that represents the difference or residual between measured variables and predictions from an underlying first principles model.

In another embodiment of the present invention, computer-implemented methods, systems, and computer program products enable a machine learning model to be developed for an unknown or unmeasurable input parameter (i.e. missing measurement value) of a process simulation model.

In yet another embodiment, a computer program product comprises computer code instructions carried on a storage medium, working memory, computer readable medium, and the like. The instructions are executable by one or more digital processors and implement process modeling, simulation, optimization, and process control of a chemical process of interest in a subject industrial plant. In particular, the instructions include, when executed by a digital process: (a) modeling (generating a model of) the chemical process, and (b) based on predictions made by the generated model, improving (or enabling improvements in) performance of the chemical process at the subject industrial plant. The generated model predicts progress, i.e., operating conditions, physical properties, and the like, of the chemical process. The generated model includes a hybrid model formed of a first principles model having at least one element enhanced by a machine learning model of the chemical process. The improving of performance of the chemical process is by any of: enabling a process engineer to troubleshoot the chemical process, enabling debottlenecking a portion of the chemical process, and optimizing performance of the chemical process at the subject industrial plant based on predictions made by the generated model. In a process control embodiment, the instructions include automatically controlling settings of equipment of the subject industrial plant based on predictions made by the generated model.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 9A graphs Parameter estimation predicted values, and FIG. 9B graphs Embedded ANN predicted values.

DETAILED DESCRIPTION

Figure 1A:
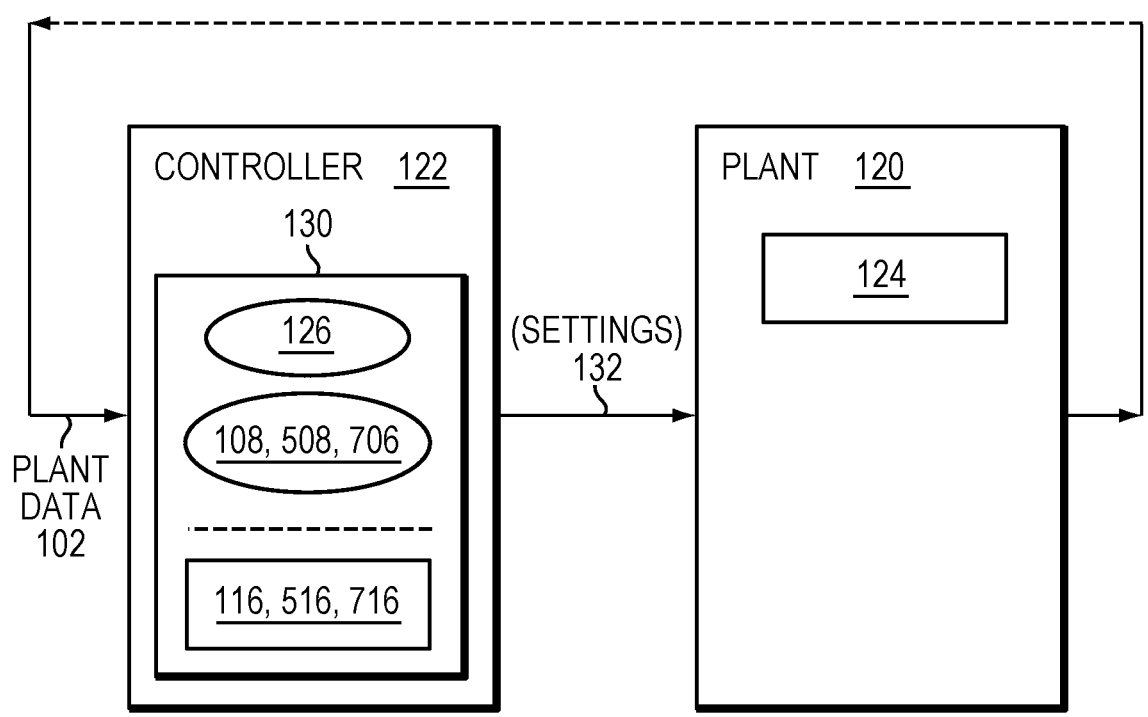
FIG. 1A is a block diagram of a process control method and system embodying the present invention.

A description of example embodiments follows.

The present invention is directed at a new paradigm for modeling and simulation of industrial chemical processes by combining first principles knowledge with machine learning techniques. The new paradigm is a specific application of a more general framework of using artificial intelligence to improve asset optimization in the process industry (see Chan, et al., U.S. patent application Ser. No. 16/434,793 filed Jun. 7, 2019 herein incorporated in its entirety).

Simulation models must incorporate data to ensure an accurate representation of the chemical/industrial process of interest. Approaches to incorporate data into process simulation models have included regressing unknown parameters and other parameter estimation strategies such as extended Kalman filtering. More recently, artificial neural networks, a type of machine learning algorithm, have been investigated as a method for estimating parameters in process models. One of the first implementations of this strategy was for the reaction kinetics in a fedbatch bioreactor (see Psichogios, D. C. and Unger, L. H., "A Hybrid Neural Network-First Principles Approach to Process Modeling," AIChE Journal, 38, (1992), pgs 1499-1511).

Machine learning provides a powerful mechanism to incorporate data into process models. Machine learning algorithms are typically easy to automate and can continuously improve as more data becomes available. In addition, these algorithms are good at handling multi-dimensional data and datasets containing different data types. Applicants use the integration of machine learning with first principles models to address the shortcomings of independent machine learning and first principles models.

In the case of a pure machine learning model, the model performs well only near data that it has been trained on, i.e. it does not extrapolate well. Therefore, when new conditions arise in a plant, a pure machine learning model may not be sufficiently accurate. In addition, machine learning models have a lack of transparency and interpretability, and such models can violate mass and energy balance constraints. This is typically termed a "black-box" model. This characteristic makes it difficult for engineers to understand and to be confident in the machine learning model predictions.

A pure first principles model may not be accurate when compared to actual data due to assumptions. In some cases, the physical mechanism is not understood well enough to enable a mathematical description of the phenomena. In other cases, a detailed mathematical description is possible but the number and characteristics of the equations make the solution difficult if not impossible to obtain numerically.

By combining these methods (machine learning and first principles modeling), the result is a hybrid model that is robust, accurate, and easily maintained. The application of a hybrid approach is gaining traction in the process industry (see Zendehboudi, et. al., "Applications of Hybrid Models in Chemical Petroleum, and Energy Systems: A Systematic Review," Applied Energy, 228, (2018), pgs 2539-2566). However, prior to Applicant's invention, there is no systematic approach or framework that enables engineers to apply these hybrid methods to process models.

Turning to FIG. 1A, illustrated is a process control (or more generally a process modeling and simulation) method and system 140 embodying the present invention and above mentioned new paradigm combining first principles modeling techniques and machine learning. Briefly, an industrial plant (chemical processing plant, refinery, or the like) 120 performs chemical processes of interest 124. Non-limiting examples include pharmaceuticals production, petroleum refining, polymer processing, and so on. Plant equipment includes distillation columns, various kinds of reactors and reactor tanks, evaporators, pipe systems, valves, heaters, etc. by way of illustration and not limitation. Plant data 102 represents inputs (feed amounts, values of certain variables, etc.) and outputs (products, residuals, physical operating characteristics/conditions, etc.) of the chemical process 124. A controller 122 employs model process control to configure and maintain settings 132 (i.e., parameter values, temperature selection, pressure settings, flow rate, other values of variables representing physical characteristics) operating the plant equipment in carrying out the subject chemical process 124.

Figure 1B:
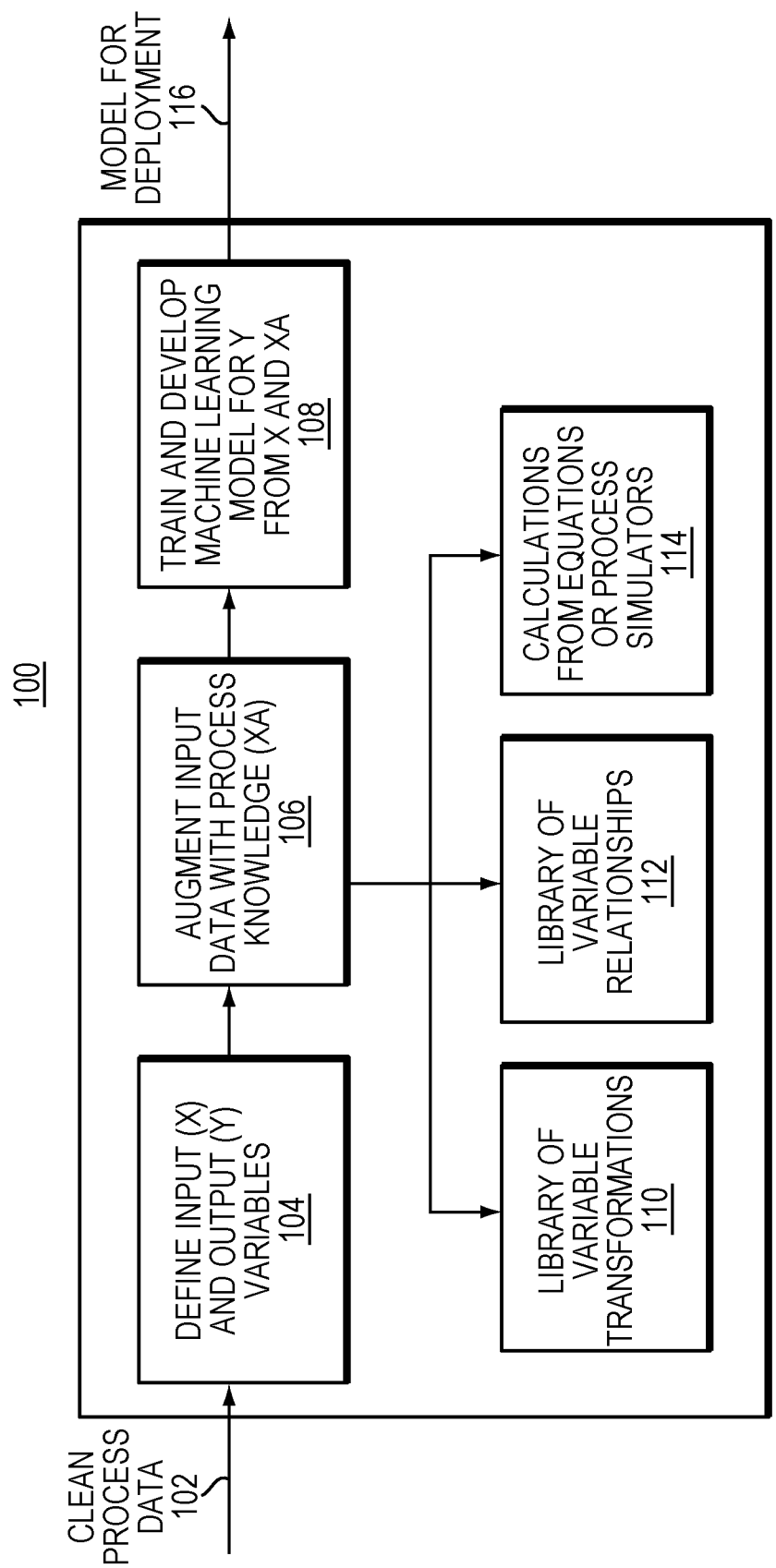
FIG. 1B is a flow diagram showing workflow for developing a process model from a machine learning model with data that has been augmented or enhanced with process knowledge in an embodiment.
Figure 5:
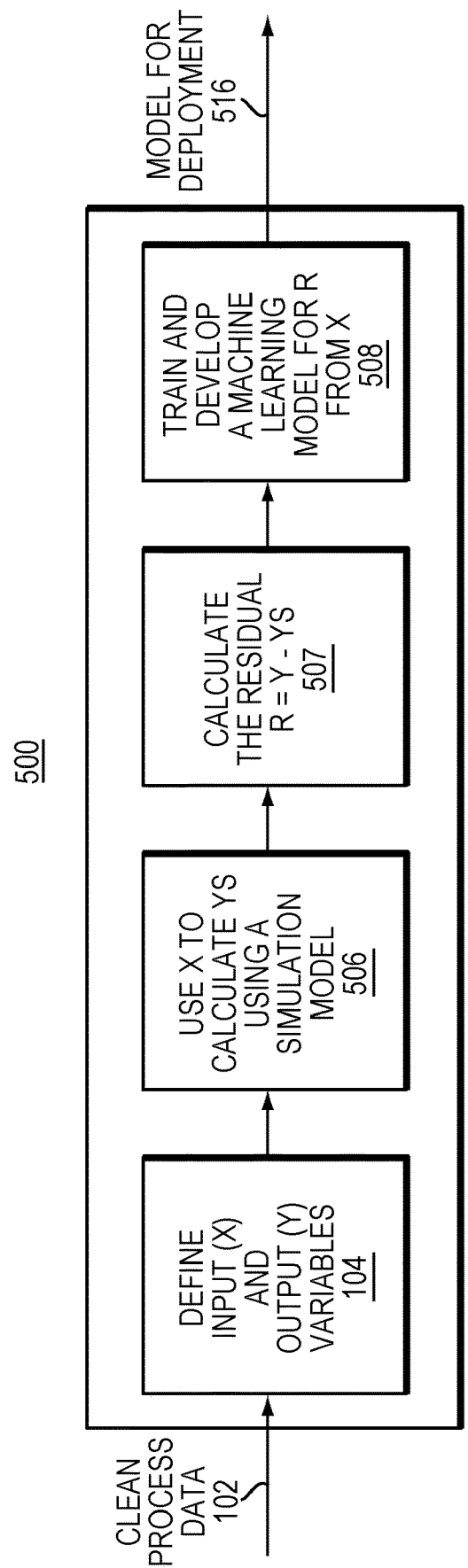
FIG. 5 is a flow diagram showing workflow for developing a process model where a machine learning model is used to characterize the difference between a simulation model and process data in an embodiment.
Figure 7:
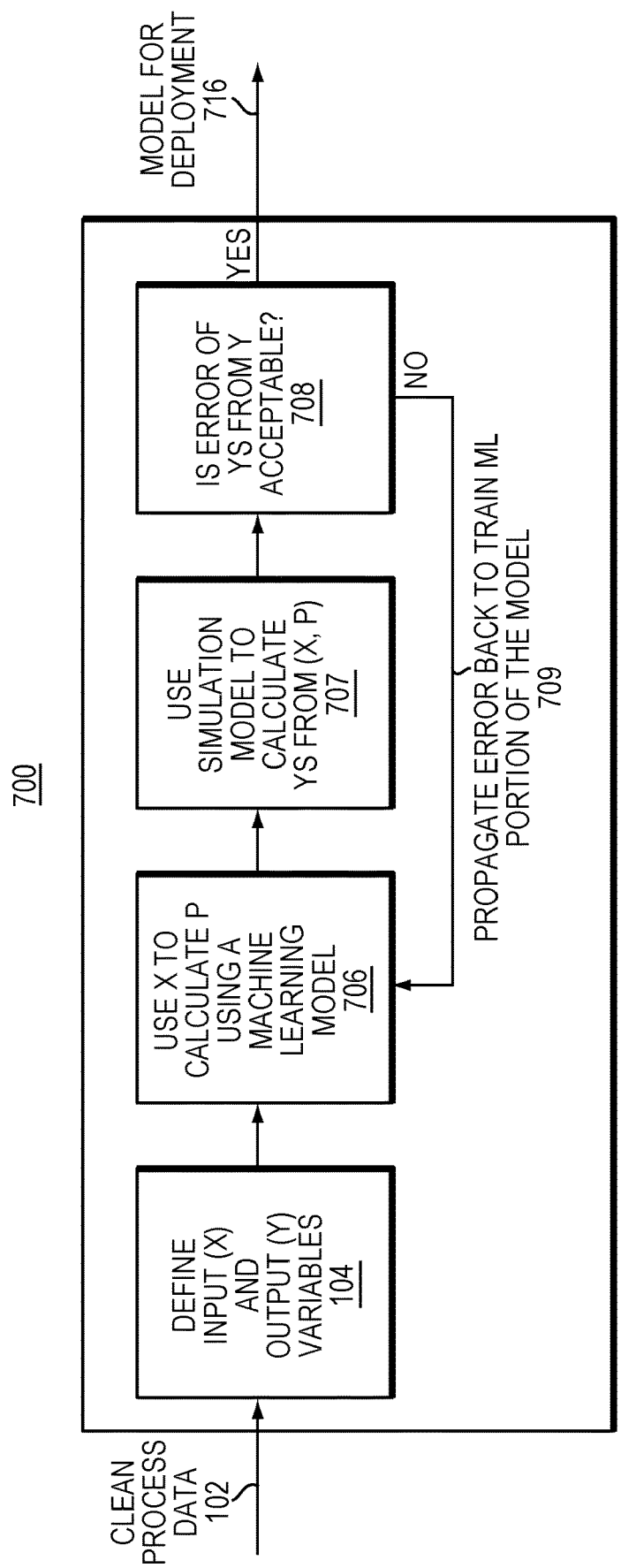
FIG. 7 is a flow diagram showing workflow for developing a process model where a machine learning model is used to characterize unknown parameters of a simulation model in an embodiment.

The model process control is based on models (of the subject chemical process) generated by process modeling system 130. In embodiments of the present invention, the process modeling system 130 generates and deploys hybrid models 116, 516, 716 (detailed later) of the subject chemical process 124 by combining a first principles model 126 and a machine learning model 108, 508, 706. The hybrid models 116, 516, 716 predict, with improved accuracy, the progress and physical characteristics/conditions of the subject chemical process 124. The predictions enable improved performance of the subject chemical process by any of: enabling a process engineer to troubleshoot the chemical process, enabling debottlenecking of the chemical process, and optimizing performance of the chemical process at the industrial plant. The hybrid model predictions further include indications of any need to update the settings 132 and specific values to quantitatively update the settings 132. FIGS. 1B, 5, and 7 further detail the methods and techniques 100, 500, 700 for combining first principle models 126 and machine learning models 108, 508, 706 to generate Applicant's inventive and advantageous hybrid models 116, 516, 716 in process modeling, simulation, optimization, and control 140.

In a generalized sense, controller 122 is an interface between process modeling system 130 and industrial plant 120. Other interfaces between process modeling system 130 and plant 120 in addition to and/or instead of controller 122 are suitable and in the purview of one skilled in the art given the disclosure herein. For example, there may be an interface between process modeling system 130 and plant 120 systems. There may be a user interface for process modeling system 130. Process modeling system 130 may effectively be part of a simulator or optimizer for non-limiting examples. Various such interfaces enable an end user, e.g., process engineer, to utilize model predictions in (a) monitoring and troubleshooting plant operations and the chemical process of interest 124, in (b) identifying bottlenecks in chemical process 124, and in (c) de-bottlenecking the same, and so forth. In embodiments, an interface enables a process engineer to utilize the model predictions in optimizing (online or offline) the chemical process 124 at the plant 120. In these and other similar ways, embodiments enable various improvements in performance of the chemical process 124 at the subject plant 120.

Augmented Hybrid Model

In one embodiment of the invention, a computer-implemented method, system, and/or computer program product performs the workflow depicted in FIG. 1B. In this process 100, a machine learning model 116 is generated that can translate input variables (X) into a desired set of output variables (Y) describing a chemical process of interest and having process data 102. System 100 receives or otherwise obtains the raw process data 102 as input. For an accurate machine learning model 116, module 104 selects the input variables that cover the necessary dependencies of the output variables.

In turn, module 106 automatically generates a list of features based on first principles knowledge (such as thermodynamic and chemical engineering domain knowledge) and models of chemical processes. These features could include physical properties such as density, viscosity, heat capacity, dimensionless numbers corresponding to phenomena occurring in the process as well results calculated by a theoretical model of the process. The automatically generated list of features transforms the raw input measurements from module 104 into more reliable and representative inputs into the machine learning training model 108. The resulting new features or augmented input data (XA) of module 106 can be a transform of an existing input, a combination of inputs, or a calculation from a model. These enhanced inputs reduce the time required for feature engineering and result in a more accurate model 116.

As an example, consider predicting the pressure drop across a pipe where the simultaneous flow of gas and liquid is occurring. The measured data (X) may include the pressure, temperature, densities, and velocities of the fluids. These inputs can be used along with the measured output pressure drop (Y) to train machine learning model 108.

The Tulsa University Fluid Flow Project (TUFFP) is a cooperative industry-Tulsa University research group for multiphase pipeline flow in collaboration for more than 35 years. The experimental facilities include a flow loop that can handle two-phase air-water and air-oil flow and three-phase air-water-oil flow. TUFFP provides a categorized database of approximately 40 experimental datasets, which can be divided by authors, number of phases, and types of fluids. Three datasets for an air-kerosene system were selected to test a hybrid modeling approach. For the datasets see:

Brill, et al., "Transportation of liquids in multiphase pipelines under low liquid loading conditions." Ph.D. Dissertation, The University of Tulsa (1995);

Caetano, "Upward vertical two-phase flow through an annulus." Ph.D. Dissertation, The University of Tulsa (1985); and Yang, "A study of intermittent flow in downward inclined pipes." Ph.D. Dissertation, The University of Tulsa (1996). In addition to datasets, a first principles model called the Tulsa Unified Model has been developed by TUFFP to predict the pressure drop in multiphase flow. See H. Q. Zhang, Q. Wang, C. Sarica, and J. P. Brill, "Unified model for gas-liquid pipe flow via slug dynamics-Part 1: Model development", Trans. Of the ASME, 25, (2003), 266-273; and H. Q. Zhang, Q. Wang, C. Sarica, and J. P. Brill, "Unified model for gas-liquid pipe flow via slug dynamics-Part 2: Model validation", Trans. Of the ASME, 25, (2003), 274-283.

Figure 2:
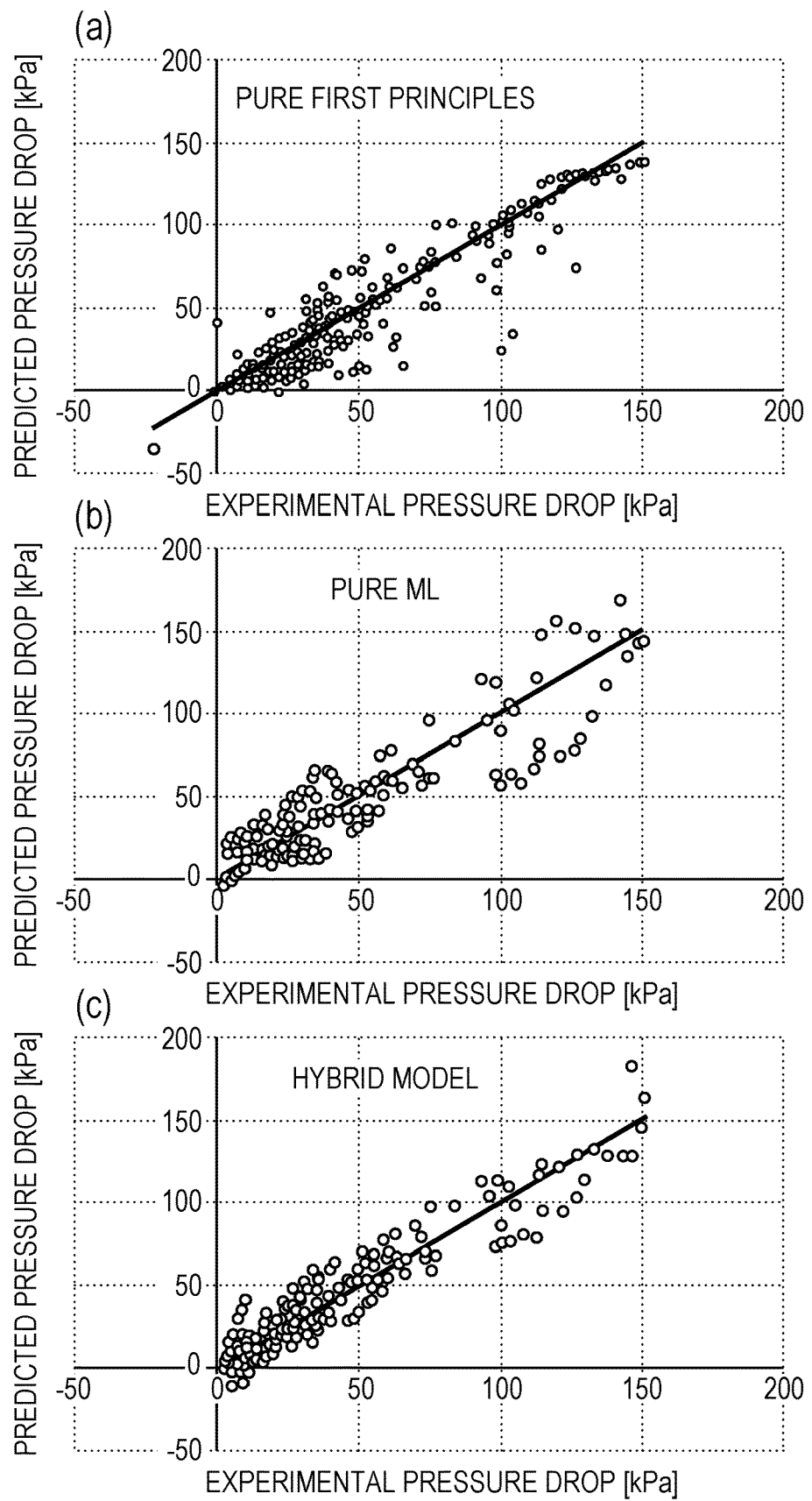
FIG. 2 illustrates graph comparisons of pressure drop predictions with experimental measurements in a pipe for (a) a pure first-principles model, (b) a pure PLS machine learning model, and (c) a hybrid model embodying the present invention.

Table 1 lists the 12 parameters that were measured in the 393 experiments investigated. By using the Tulsa Unified Model, a pure first principles approach can be used to predict the pressure drop across the pipes for this experimental data set. As shown in FIG. 2(*a*), this model does a good job predicting the pressure drop with an $R^2$ value of 0.896.

TABLE 1

| Measured Data | Augmented Data |
|---|---|
| Pressure | Density Ratio |
| Temperature | Gas Reynolds Number |
| Pipe Diameter | Liquid Reynolds Number |
| Pipe Inclination | Mixture Reynolds Number |
| Pipe Length | (Gas Superficial Velocity)$^2$ |
| Gas Superficial Velocity | (Liquid Superficial Velocity)$^2$ |
| Gas Density | (Gas Sup. Vel.)*(Liquid Sup. Vel.) |
| Gas Viscosity | |
| Liquid Surface Tension | |
| Liquid Superficial Velocity | |
| Liquid Density | |
| Liquid Viscosity | |

The data can also be used to train a machine learning model 108 to predict the pressure drop. A supervised learning technique of partial least squares regression (PLS) was applied. Using only the measured data as inputs, the PLS model does a reasonable job predicting the pressure drop as shown in FIG. 2(*b*) but not as well as the first principles model of FIG. 2(*a*). As indicated in Table 2, the $R^2$ coefficient for the model is 0.816.

TABLE 2

| Model | $R^2$ Value |
|---|---|
| Pure First Principles | 0.896 |
| Pure Machine Learning (PLS) | 0.816 |
| Hybrid Model | 0.908 |

A mathematical description of multiphase flow indicates that the square of the velocity and the ratio of inertia to viscous forces, i.e. Reynolds number, influence the pressure drop. Therefore, these variables (XA) can be included with the measured inputs into a machine learning model 108. If the original variables are augmented with these calculated values as shown in Table 2, then a hybrid model 116 can be developed by training the PLS model 108 on this larger input data set. In this case, the predictions are shown in FIG. 2(*c*) and the $R^2$ value is 0.908, which exceeds both the pure first principles and the pure machine learning case.

Figure 3:
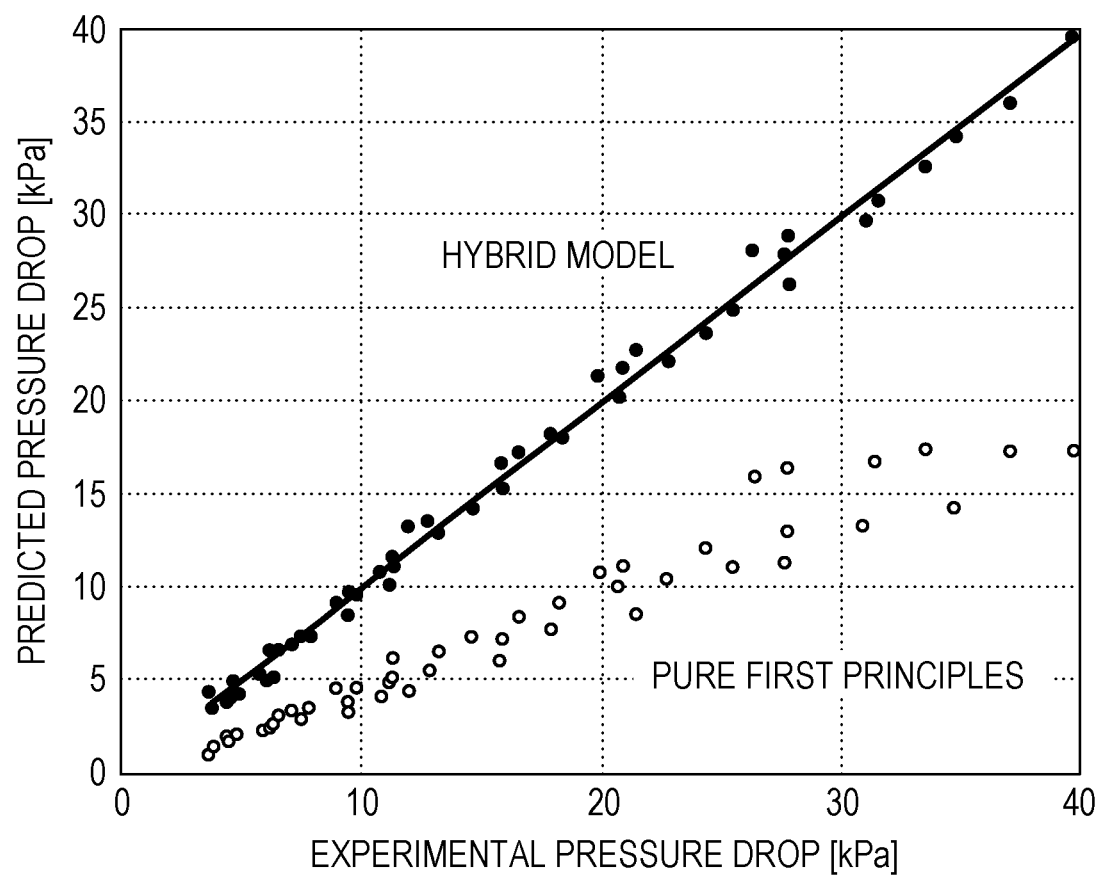
FIG. 3 is a graph comparison of pressure drop predictions with experimental measurements in a pipe for a pure first-principles model and a hybrid model of the present invention. Domain knowledge on flow patterns is utilized to reduce the data set to a particular flow regime.

Furthermore, it is well-established that during multiphase pipe flow, the phases will separate or segregate into different flow patterns or regimes. The formation of this pattern can significantly impact the pressure drop across the pipe. If a hybrid model 116 is trained only on the data for a single regime, then the model can be significantly improved. FIG. 3 shows a hybrid model 116 developed for a stratified flow regime in which the gas flows above the liquid. The model is nearly perfect. By comparison, the first principles model of the Tulsa Unified model consistently underpredicts the observed pressure drop.

Figure 4:
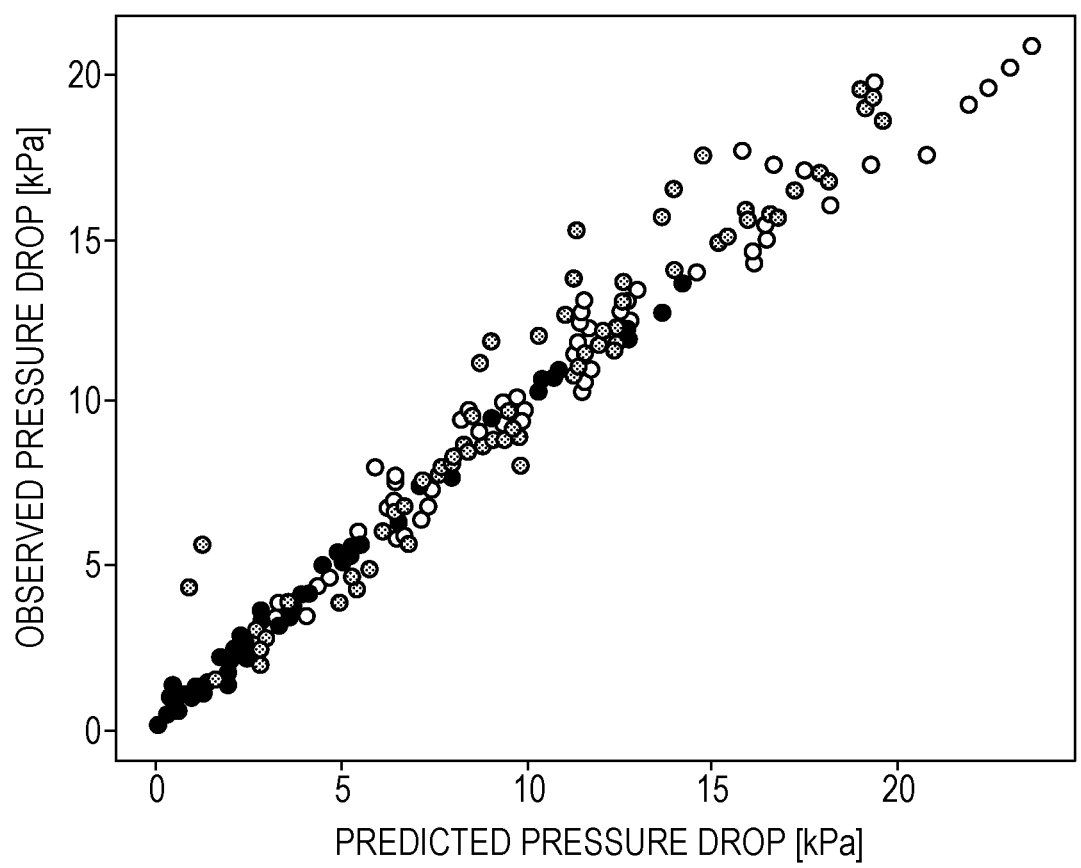
FIG. 4 is a graph of predictions for the pressure drop in a multiphase pipe flow from a hybrid model that uses an underlying random forest regressor in an embodiment.

In the preceding example, the PLS method was used as the machine learning algorithm at training step or module 108. The invention is not limited to this single machine learning technique. In this embodiment of FIG. 1B, the system 100 or module 108 has a library of different machine learning models that can be used such as random forest regression, neural networks, or support vector machines. For example, FIG. 4 shows an augmented hybrid model 116 for pipe flow using a random forest regressor. In this case, the random forest regression does a better job on the complete data set that includes the different flow regimes graphed in FIG. 4. This is because random forest regression is an ensemble technique that aggregates multiple models. It therefore combines different models for the different flow regimes.

Embodiments of system/software program 100 can automatically add new variables to the data set to enrich the inputs into a machine learning model 108. Elements 110, 112, 114 of FIG. 1B are illustrative. In one embodiment, system 100 at libraries 110, 112, 114 store key variables, relationships, and equations (or calculations) in a database(s) for different process phenomena and equipment. If certain key variables were not measured at 102 but are to be included as input at 104, then module 106 calculates these variables using first principle models supported by libraries 110, 112, 114. For example, if the viscosity of the fluid flowing through a pipe is not a measured physical property, then system 100/module 106 calculates these values by using an underlying property model, such as Aspen Properties (by Assignee Aspen Technology, Inc.), represented at libraries (databases) 110, 112, 114. Using the original input data (X) and resulting augmented data (XA), system 100/module 108 trains and develops a machine learning model for the pressure drop (Y) in resultant hybrid model 116 for deployment in process control and/or process modeling and simulation.

Figure 15A:
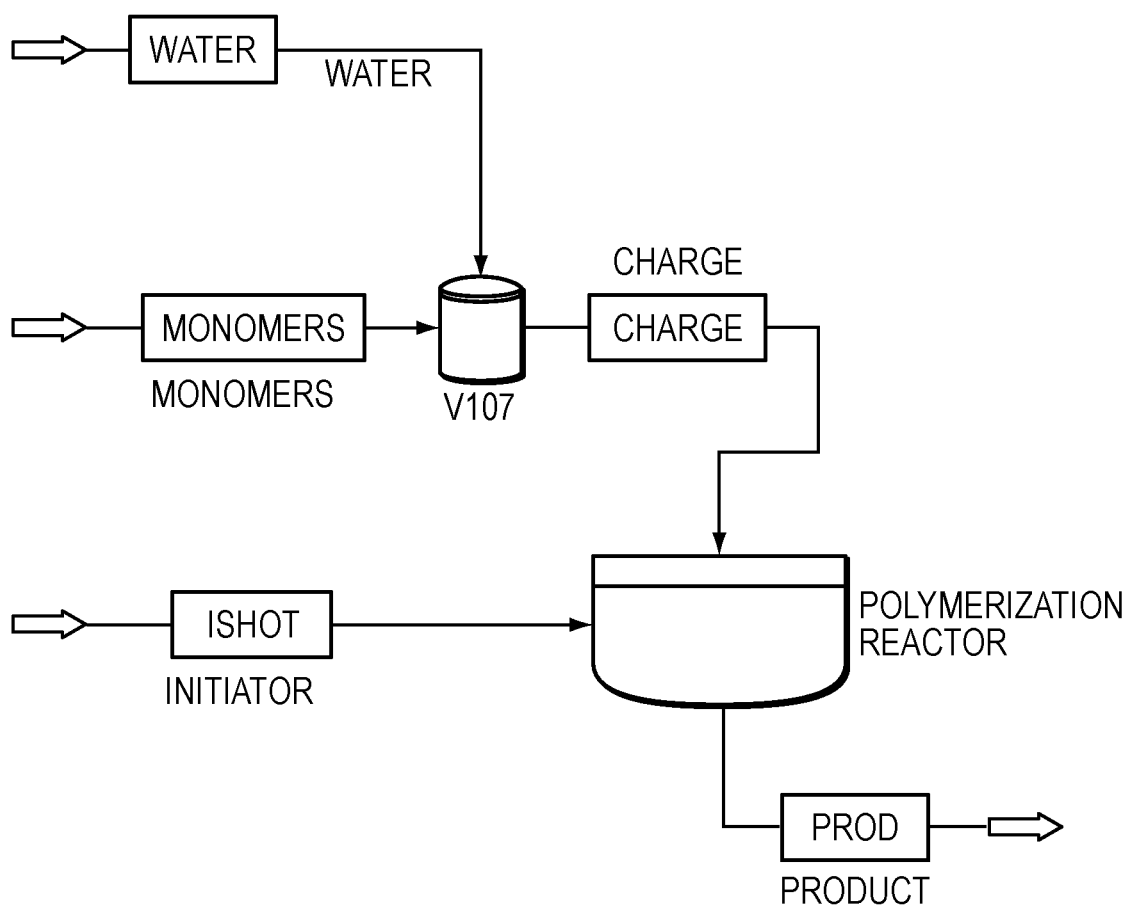
FIG. 15A is a schematic view of an example batch polymerization reactor for which a hybrid model may be formed by the augmented data method of FIG. 1B in an embodiment.
Figure 15C:
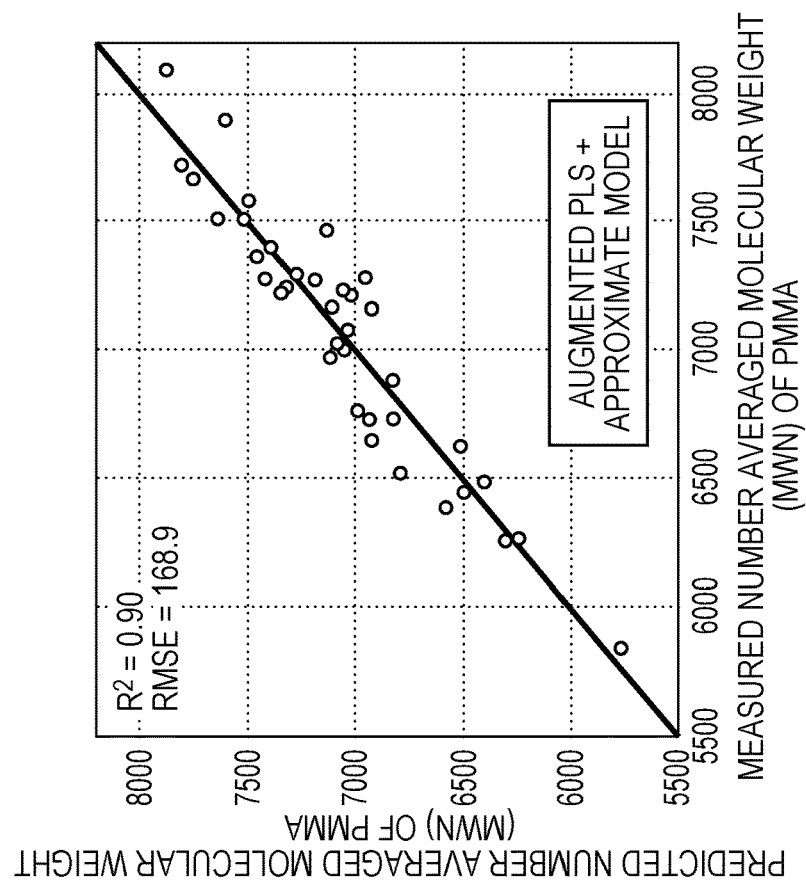
FIG. 15C is a parity plot of Predicted versus Measured Number-Averaged molecular weight (MWN) when calculations from an uncalibrated reactor model were used in addition to X variables as input to the machine learning model in the batch reactor example of FIG. 15A.
Figure 15B:
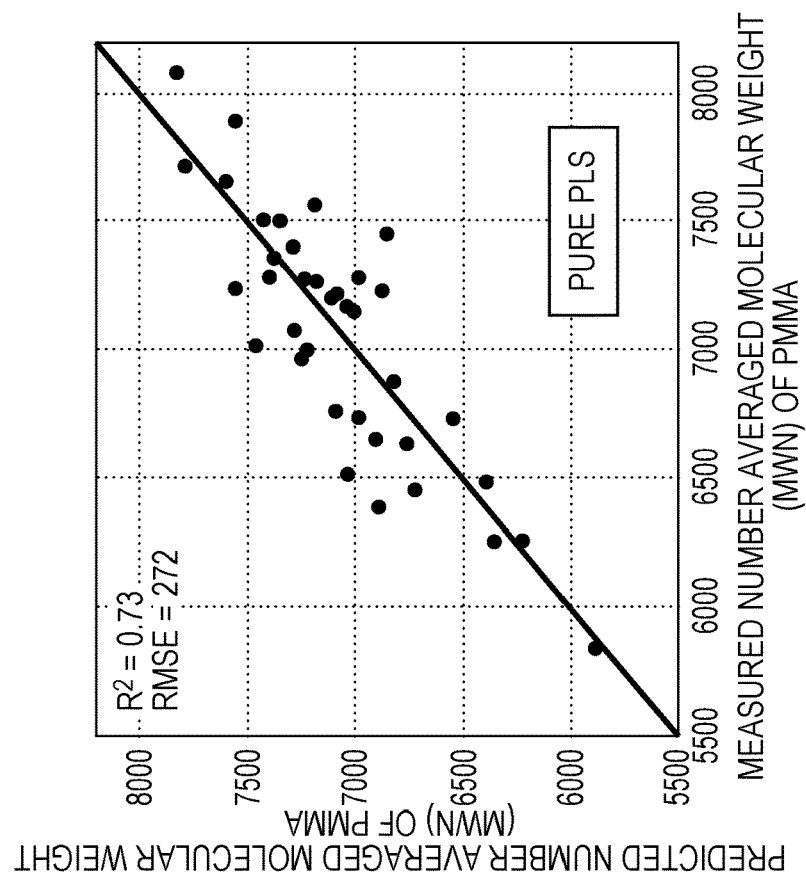
FIG. 15B is a parity plot of Predicted versus Measured Number-Averaged Molecular Weight (MWN) for a pure machine learning model (PLS) for the batch reactor in the example of FIG. 15A.

Turning now to FIGS. 15A-15C, presented is another example of an augmented hybrid model 116 according to principles of the present invention. In this example, consider the production of Poly Methyl Methacrylate (PMMA) using solution polymerization in a batch reactor (FIG. 15A). The measured input data (X) may include the composition of Monomer (Methyl Methacrylate), initiator amount, temperature and pressure in the reactor at the start of the batch, as well as the operating temperature during the batch. The measured outputs (Y) include the mass of PMMA produced at the end of the batch as well as key properties such as average molecular weight of the produced polymer. The measured inputs (X) and the measured outputs (Y) can be used to train machine learning model 108.

A simulation model built using Aspen Plus (by Assignee Aspen Technology Inc.) was used as a proxy for an industrial batch reactor and used to generate X and Y data for 37 batches. FIG. 15B shows the parity plot of measured versus predicted number averaged molecular weight (MWN) of the polymer when a pure machine learning algorithm (Partial Least Squares or PLS) was used to calculate the predicted values. The accuracy of the model was poor as indicated by the low value (0.73) of $R^2$.

FIG. 15C shows the corresponding parity plot as well as $R^2$ when calculated polymer attributes such as segment mole flow, segment mole fraction, number and weight averaged degrees of polymerization, polydispersity index, number and weight averaged molecular weights from an uncalibrated and approximate batch reactor model at 106 were used in addition to the measured inputs (X) as inputs to the machine learning (PLS) model 108. The $R^2$ value in this case was considerably larger (0.9) indicating that augmenting inputs to a machine learning model 108 with results from an uncalibrated $1^{st}$ principles model 106 significantly improves the accuracy of the machine learning model/resulting hybrid model 116.

Table 3 lists the measured input data and augmented data used in the FIG. 15A example augmented hybrid model 116 for batch polymerization.

TABLE 3

Measured and augmented data for the production of PMMA in a batch polymerization

| Measured Data | Augmented Data |
|---|---|
| Initial reactor temperature | Time profiles of the mass of each component in the reactor |
| Final reactor temperature | Time profiles of copolymer composition as segment flow (SFLOW) |
| Time when reactor reaches final temperature | Time profiles of copolymer composition as segment mole fraction (SFRAC) |
| Time when initiator flow starts | Time profiles of number-average degree of polymerization (DPN) |
| Time when initiator flow ends | Time profiles of weight-average degree of polymerization (DPW) |
| Water stream temperature | Time profiles of polydispersity index (PDI) |
| Water stream pressure | Time profiles of number-average molecular weight (MWN) |
| Water stream flow | Time profiles of weight-average molecular weight (MWW) |
| Monomers stream temperature | Time profiles of zeroth moment of chain length distribution (ZMOM) |
| Monomers stream pressure | Time profiles of first moment of chain length distribution (FMOM) |
| Monomer stream mass composition | Time profiles of second moment of chain length distribution (SMOM) |
| Initiator stream temperature | Time profiles of live composite - copolymer composition as segment mole flow (LSFLOW) |
| Initiator stream pressure | Time profiles of live composite - copolymer composition as segment mole fractions (LSFRAC) |
| Initiator stream mass composition | Time profiles of live composite - end group flows (LEFLOW) |
| Time profile of batch duration | Time profiles of live composite - end group fractions (LEFRAC) |
| Temperature profile of reactor | Time profiles of live composite - number-average degree of polymerization (LDPN) |
| Temperature set point profile | Time profiles of live composite - Zeroth moment of chain length distribution (LZMOM) |
| Reactor instantaneous duty profile | Time profiles of live composite - First moment of chain length distribution (LFMOM) |
| Reactor cumulative duty profile | Time profiles of live composite - Second moment of chain length distribution (SMOM) |

With such improved models 116 of the chemical process of interest 124, the process modeling system 130 (FIG. 1A) enables improvements in the performance of the chemical process 124 at the industrial plant 120. For non-limiting example, in process control, controller 122 outputs improved in accuracy settings (values) 132 and updates thereto for controlling the chemical process 124 and industrial plant 120 operations. In another example, the improved model output 130 through a user interface (common or known in the industry) enables a process engineer to more accurately troubleshoot the chemical process 124 offline. Similarly, the improved model output 130 may enable a process engineer to better detect bottlenecks of the chemical process 124 leading to improved debottlenecking of the chemical process and improved plant 120 operations. Likewise, the improved model output 130 enables optimizing performance of the chemical process at the subject industrial plant 120 offline or online through plant system interfaces.

Residual Hybrid Model

In another embodiment of the present invention, a system 500 generates a process simulation model 516 with the workflow described in FIG. 5. In this process 500, rather than generating a machine learning model for a specific set of outputs, the machine learning model 516 is used to represent the difference or residual between measured variables and predictions from an underlying first principles model. Raw process data 102 from the chemical process and industrial plant of interest are as described in FIG. 1B. Selector module 104 is as described above defining input variables (X) and output variables (Y) from the raw input data 102.

Next, module 104 feeds the input values (X) into a simulation model 506 to predict the output (YS). Additionally, the input values (X) can be augmented with module 106 (discussed above) before developing the simulation model. In turn, module 507 calculates the residual (R) as the difference between the simulation prediction (YS) and the observed output (Y). Training step 508 trains and develops a machine learning model 516 for the residual. In this case, the resulting machine learning model 516 is not trying to capture all of the underlying physics of the subject chemical process but instead only modeling the portion of the industrial system/chemical process not described by first principles. This effectively reduces the burden of the machine learning model 516, and in turn results in faster training (at step 508) with less data.

Figure 6:
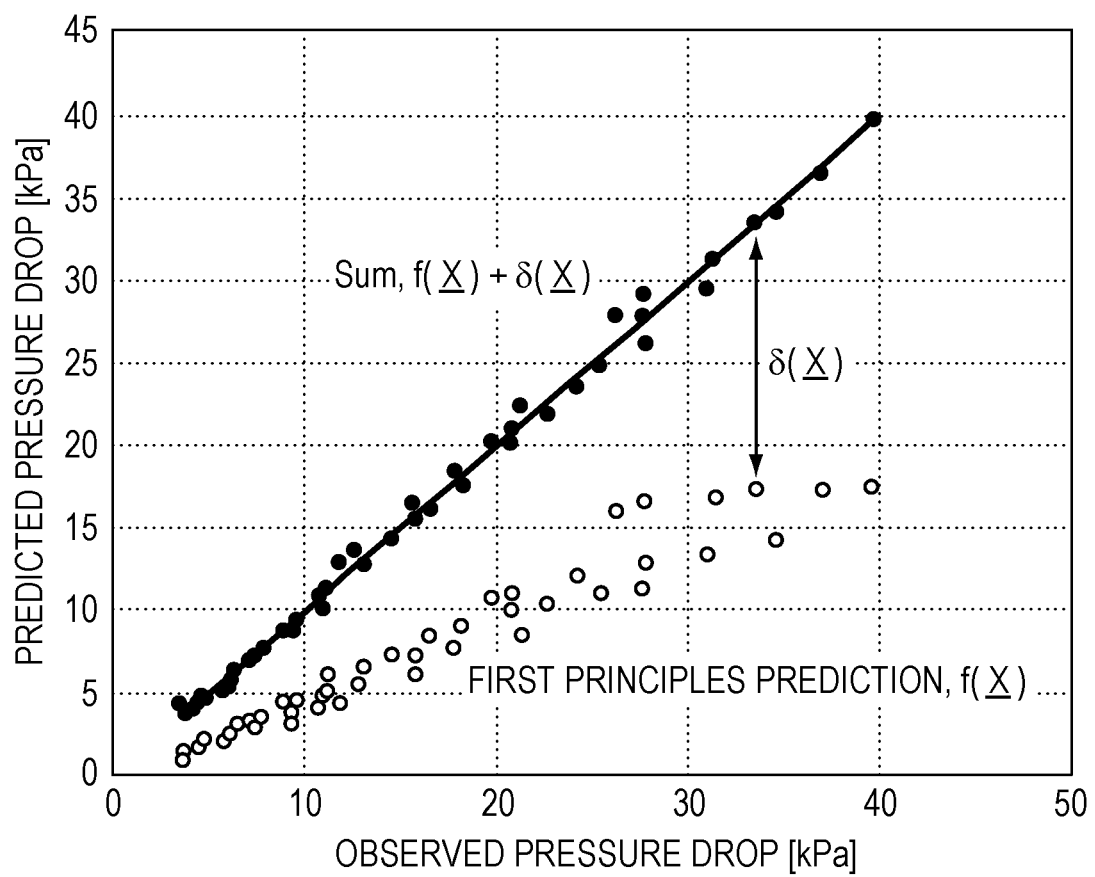
FIG. 6 is a graph of predictions for the pressure drop in a multiphase pipe flow from a hybrid model that uses a machine learning algorithm to predict the residual error of a first principles model in an embodiment.

Returning to the pipe flow example, a machine learning model 516 can be trained on the difference between the measured pressure drop and the prediction from a base first principles model. As apparent from FIG. 6, the first principles model consistently underpredicts the observed pressure drop by a nearly linear offset, which indicates that there is something not being described correctly by the first principles model. Rather than trying to tune or modify the first principles model, embodiments 500 train a machine learning model 516 to predict the difference between the prediction of the first principle model and the observed pressure drop. By using PLS, FIG. 6 shows that this type of residual model 516 can very accurately predict the pressure drop across the pipe.

The expected benefits of this type of model 516 is that the predictive power and ability to extrapolate of the first principles is retained. The machine learning portion of this hybrid model/system 500 captures the phenomena not described accurately by the first principles model.

In this embodiment of the invention, the process modeling system 130 (FIG. 1A) includes a library of first principle models 126 that can be used as the base of this hybrid approach. In addition, process modeling system 130 can interface or import predictions from other first principle process modeling software programs (computer applications) such as Aspen Plus or Aspen HYSYS (both of Assignee Aspen Technology, Inc.). The process modeling system 130 combines the use of first principle models 126 with the use of residual models 516 generated by method/system 500 described above. In particular, process modeling system 130 corrects certain predictions made by the first principles model(s) 126 as applied to the chemical process of interest 124. Process modeling system 130 uses the corresponding residual model 516 to correct the first principle model predicted amounts of a physical condition or property. The resulting corrected physical condition prediction (resulting predicted amounts) is improved in accuracy, thus improving output (model of the chemical process of interest 124) of the process modeling system 130. As a consequence, controller 122 outputs improved in accuracy settings (values) 132 and updates thereto for controlling the chemical process 124 and industrial plant 120 operations. In addition, the improved model output 130 through a user interface (common or known in the industry) enables a process engineer to more accurately troubleshoot the chemical process 124 offline. Similarly, the improved model output 130 may enable a process engineer or other to better detect bottlenecks of the chemical process 124 leading to improved debottlenecking of the chemical process. Likewise, the improved model output 130 enables optimizing performance of the chemical process at the subject industrial plant (offline or online through plant system interfaces).

Embedded Hybrid Model

In another embodiment of the present invention, system/method 700 generates a process simulation model 716 using the workflow in FIG. 7. In this process 700, raw process data 102 from the chemical process 124 and industrial plant 120 of interest are as described in FIG. 1B. Selector module 104 is as described above defining input variables (X) and output variables (Y) from the raw input data 102.

System/method 700 develops a working first principles model 707 (also referred to herein as simulation model 707) using a process simulator, e.g. Aspen Plus, Aspen HYSYS, etc. (both of Assignee Aspen Technology, Inc.). The working first principles/simulation model 707 may not fit the observed data 102 well due to assumptions in the model or unknown values of certain input parameters (P). A machine learning model 706 is used to determine and predict the value of these unknown or unmeasurable parameters (P) as a function of known measurements (input X). These function predictions then become inputs (as X and P) into the working first principles/simulation model 707. In response, first principles/simulation model 707 calculate simulated predictions (YS).

This approach has the following added advantages relative to other methods. First, mass and energy balances are always conserved due to the fact that the machine learning is done within the constraints of a self-consistent $1^{st}$ principles model. Second, the hybrid model is able to accurately predict quantities that are important for monitoring the process but may not have been measured (also referred to as inferentials) due to limitations of instrumentation and other factors. The inferentials could include concentrations and flows of byproducts, temperature or pressures inside the equipment etc. The accuracy of the inferentials is ensured by the fact that the $1^{st}$ principles model uses accurate thermodynamics and satisfies fundamental mass and atom balance constraints.

In method/system 700, it is important to note that the machine learning model 706 is not trained based on the error of these parameters (P). This is not possible as field measurements do not exist for the parameters (P) being estimated by the machine learning model 706. Instead, error calculation module or step 708 calculates the errors of the output prediction (YS) of combined machine learning and first principles models 706, 707 relative to the field measurement outputs (Y). If the calculated error (/(YS)−(Y)/) does not satisfy a threshold acceptability level, then error calculation module 708 propagates at 709 the calculated errors into the machine learning model 706 for training.

As an example, consider a process simulation model 707 for a chemical reactor. Complete specification of this model requires inputs for various reaction rate constants as well as equations outlining the dependence of the reaction rates on the reactant composition. Generating accurate rate expressions often requires extensive experimentation and model calibration. Embodiments 700 train a machine learning model 706 such as an artificial neural network (ANN) using data 104 to predict reaction rate constants and/or reaction rates used in the reactor simulation model 707.

The ANN model 706 is not trained based on errors of the ANN model prediction with measured rate constants or reaction rates as these measurements are usually not available. Instead, error calculation module 708 calculates the error between the overall simulation model prediction of 707 and measured data 102, such as reactor yield, and uses the calculated error to train the ANN model 706. Step 709 is illustrative propagating the calculated error of module 708 back to the machine learning/ANN model 706 for model training. Ultimately the resulting hybrid model 716 for process modeling system 130 is generated when the calculated error of module 708 is acceptable, i.e., meets a predefined threshold.

Figure 8:
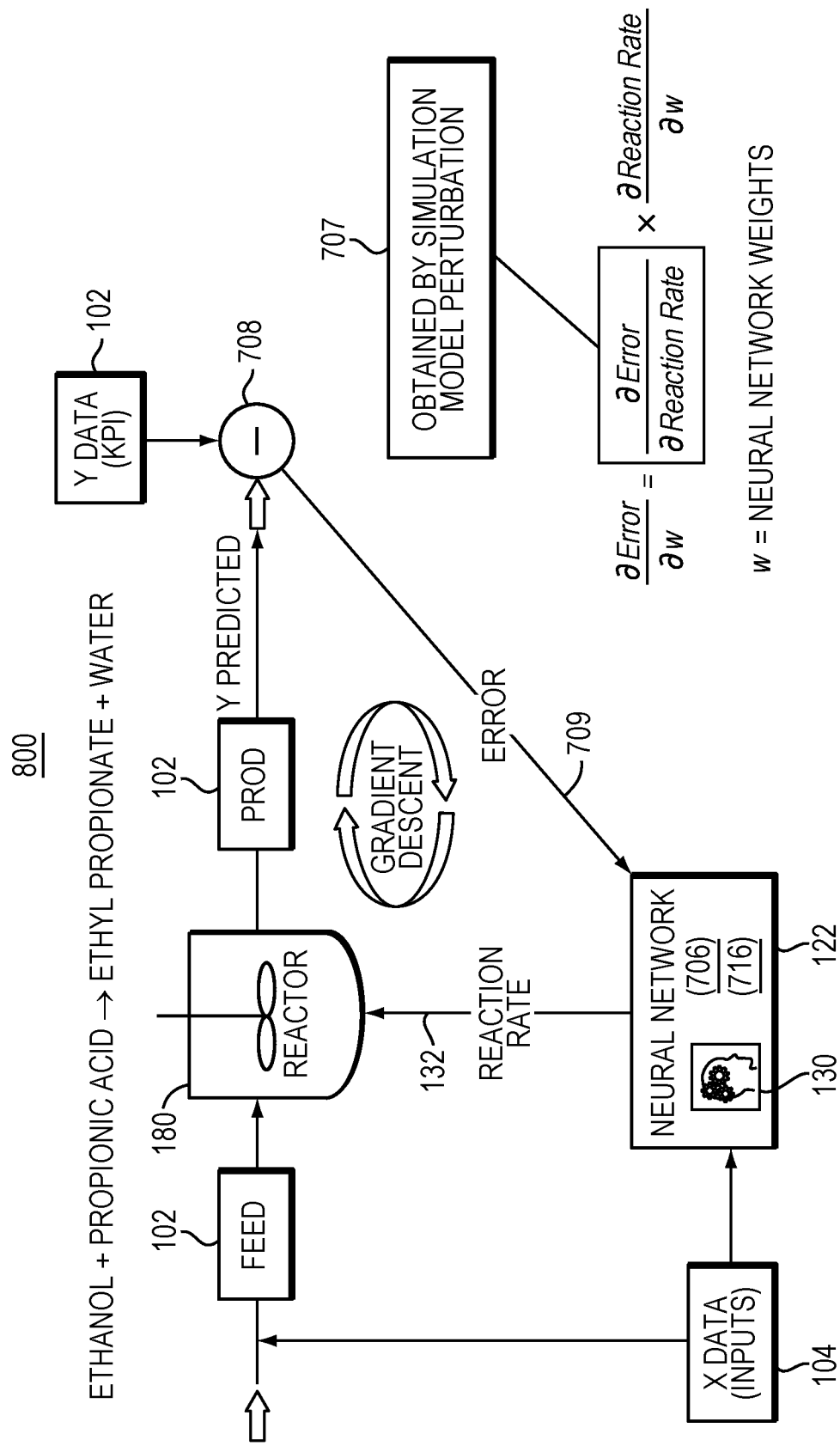
FIG. 8 is a graphical illustration of techniques used in an embodiment to leverage machine learning (Artificial Neural Network or ANN) to learn the functional form of the dependency of the reaction rate on the composition of feed to an example Continuous Stirred Tank Reactor (CSTR).

FIG. 8 illustrates a hypothetical scenario for an esterification reaction 800 in a continuous stirred tank reactor (CSTR) 180 where the reaction taking place is

ETHANOL+PROPIONIC ACID→ETHYL PROPIONATE+WATER

And the true reaction rate is given by:

$$\text{Rate} = k_{base}[\text{ETHANOL}]^{0.8}[\text{PROPIONIC ACID}]^{2.5}[\text{IMPURITY}]^2 \quad (1)$$

Where
$k_{base}$ Rate constant;
[ETHANOL]=Mole fraction of ethanol in the reactor 180;
[PROPIONIC ACID]=Mole fraction of propionic acid in the reactor 180; and
[IMPURITY]=Mole fraction of a known impurity in the reactor 180.

The input data 104 includes the following measurements:
ESTER production rate (kg/hr)
ETHANOL, PROPIONIC ACID and IMPURITY mass flow rates (kg/hr) in the feed 102.

These measurements were generated by using an Aspen Plus (by Assignee Aspen Technology, Inc.) simulation 707 as a proxy for raw plant data 102. This was done by adding noise to simulation results obtained by using the rate expression described by Equation 1 (ground truth) in an Aspen Plus RCSTR model (by Assignee Aspen Technology, Inc.).

A model 716 for predicting the ESTER production can be built within an existing commercial simulator in the following ways:

Traditional Parameter Estimation

A reactor model 707 with the appropriate feed and product streams is configured within a simulator like Aspen Plus (by Assignee Aspen Technology, Inc.). The known reaction mechanism is used to postulate an elementary rate expression of the form:

$$\text{Rate} = k[\text{ETHANOL}][\text{PROPIONIC ACID}] \quad (2)$$

Where k is a constant to be specified or estimated from data using standard parameter estimation. This rate expression is used by the reactor model 707 to calculate the Ethyl Propionate production based on feed and reactor conditions 102.

Embedded Hybrid Model (Non-Lumped)

A reactor model 707 with the appropriate feed and product streams is configured within a simulator like Aspen Plus (by Assignee-Applicant Aspen Technology, Inc.). The known reaction mechanism is used to postulate an elementary rate expression of the form:

$$\text{Rate} = k_{ANN}[\text{ETHANOL}][\text{PROPIONIC ACID}] \quad (3)$$

Where $k_{ANN}$ is a function of feed conditions and its functional form is "learnt" from the data by the ANN 706.

This rate expression is used by the reactor model 707 to calculate the Ethyl Propionate production based on feed and reactor conditions 102.

Embedded Hybrid Model (Lumped)

A reactor model 707 with the appropriate feed and product streams is configured within a simulator like Aspen Plus (by Assignee-Applicant Aspen Technology, Inc.). No rate expression is postulated. Rate is a function of feed composition and its functional form is "learnt" from the data by the ANN 706.

$$\text{Rate} = \text{Rate}_{ANN} \quad (4)$$

Weights of the ANN model 706 are defined as a function of the calculated errors by error calculation module 708 described above in FIG. 7. In ongoing cycles of operation, propagation 709 of the calculated error updates the values of the weights of the ANN 706 in deployed process model 716 in process modeling system 130. In turn, process modeling system 130 produces improved output, namely increased in accuracy predictions of physical conditions (e.g., reaction rate) of the subject chemical process 800. In response, the controller 122 is able to efficiently adjust settings 132 of the CSTR 180 and industrial plant 120 operation as heretofore unachieved in the art.

FIG. 8 represents a graphical illustration of the technique used to leverage machine learning (ANN) 706 to learn the functional form of the dependency of the reaction rate on feed composition.

Figure 9B:
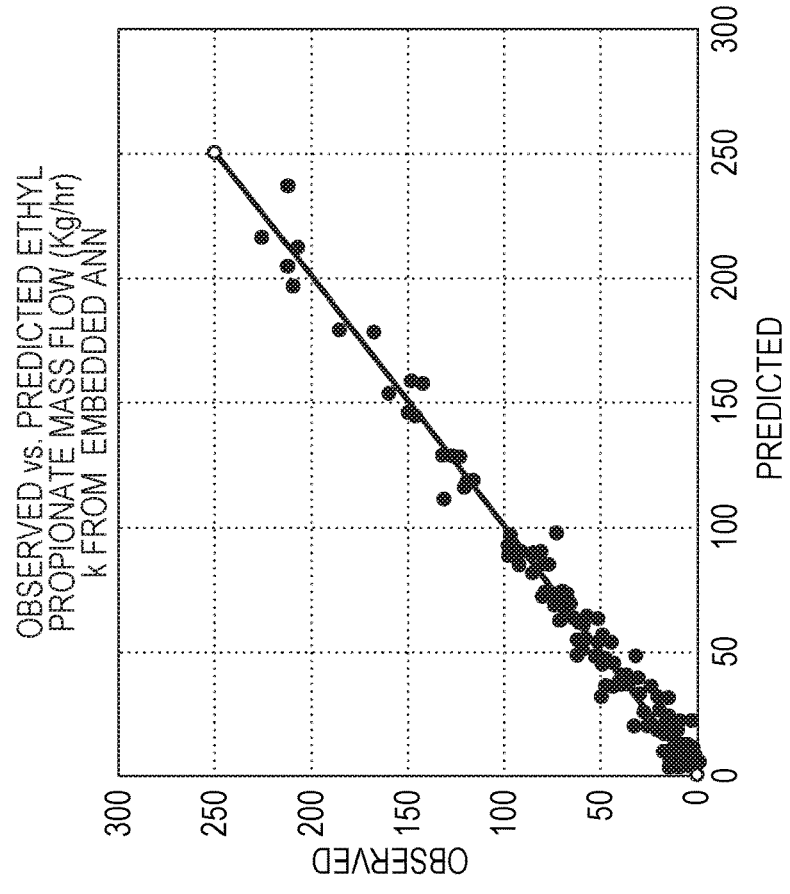
FIGS. 9A and 9B are graphs of observed versus predicted ESTER production rate parity plots obtained from using embedded ANN versus parameter estimation for the prediction of the rate constant in the postulated (incorrect) rate expression Rate=k[ETHANOL] [ACID] in the example of FIG. 8.
Figure 9A:
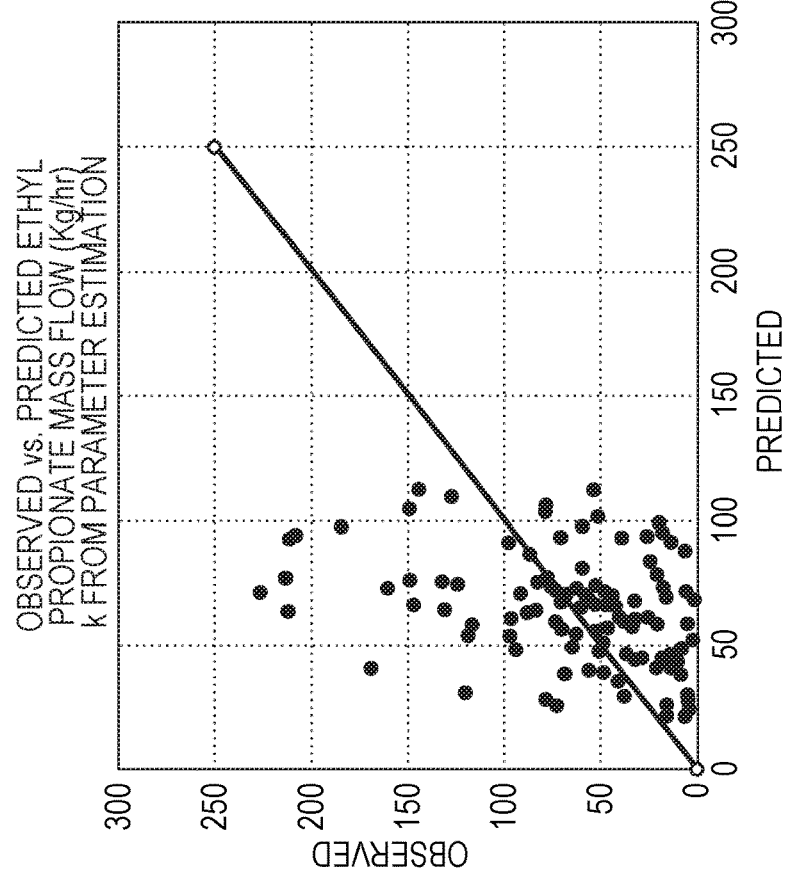

FIG. 9A shows the observed versus predicted Ethyl Propionate production rate parity plots when conventional parameter estimation is used to estimate the rate constant k in the above example FIG. 8. The results are poor because parameter estimation assumed k to be constant and does not capture the effect of IMPURITY on the reaction rate.

FIG. 9B shows the corresponding results when the embedded ANN model 706 was trained to predict the rate constant in the postulated (incorrect) rate expression:

$$\text{Rate} = k[\text{ETHANOL}][\text{PROPIONIC ACID}] \quad (5)$$

The resulting $R^2$ of 0.95 indicates that the embedded ANN model 706 was able to learn the functional form of the rate constant and its dependence on the impurity, and was able to consequently compensate for the deficiency in the postulated rate expression.

Figure 10:
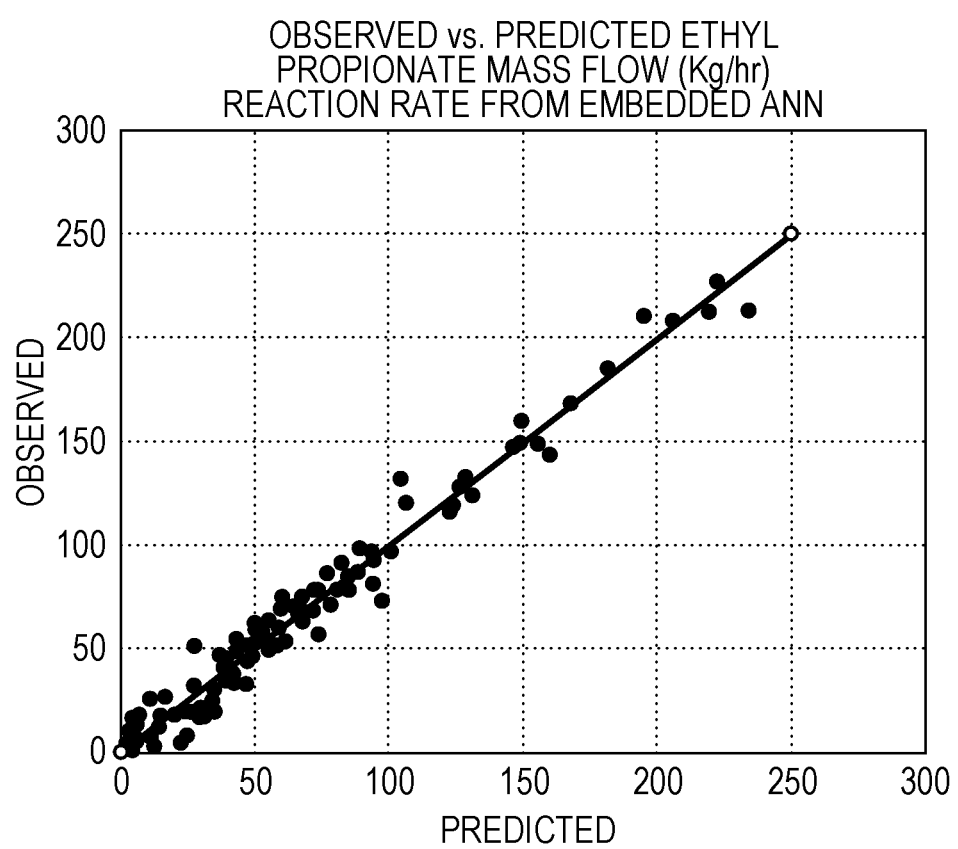
FIG. 10 is a graph of observed versus predicted ESTER production rate parity plots for the case when an embedded ANN is used to calculate the reaction rates for the reactor (CSTR) simulation model in the example of FIG. 8.

FIG. 10 shows the observed versus predicted Ethyl Propionate production rate parity plots for the case when an embedded ANN model 706 was used to calculate the reaction rates used in the reactor simulation model 707. The resulting $R^2$ of 0.978 indicates that embedded NN 706 was able to learn the functional form for the rate expression and its dependence on the impurity from ESTER production data.

| Solution Approach | $R^2$ Value |
| --- | --- |
| Parameter estimation | 0.1 |
| Embedded hybrid model (non-lumped) | 0.972 |
| Embedded hybrid model (lumped) | 0.978 |

Embedded Hybrid Model for Membrane Separation

Figure 11:
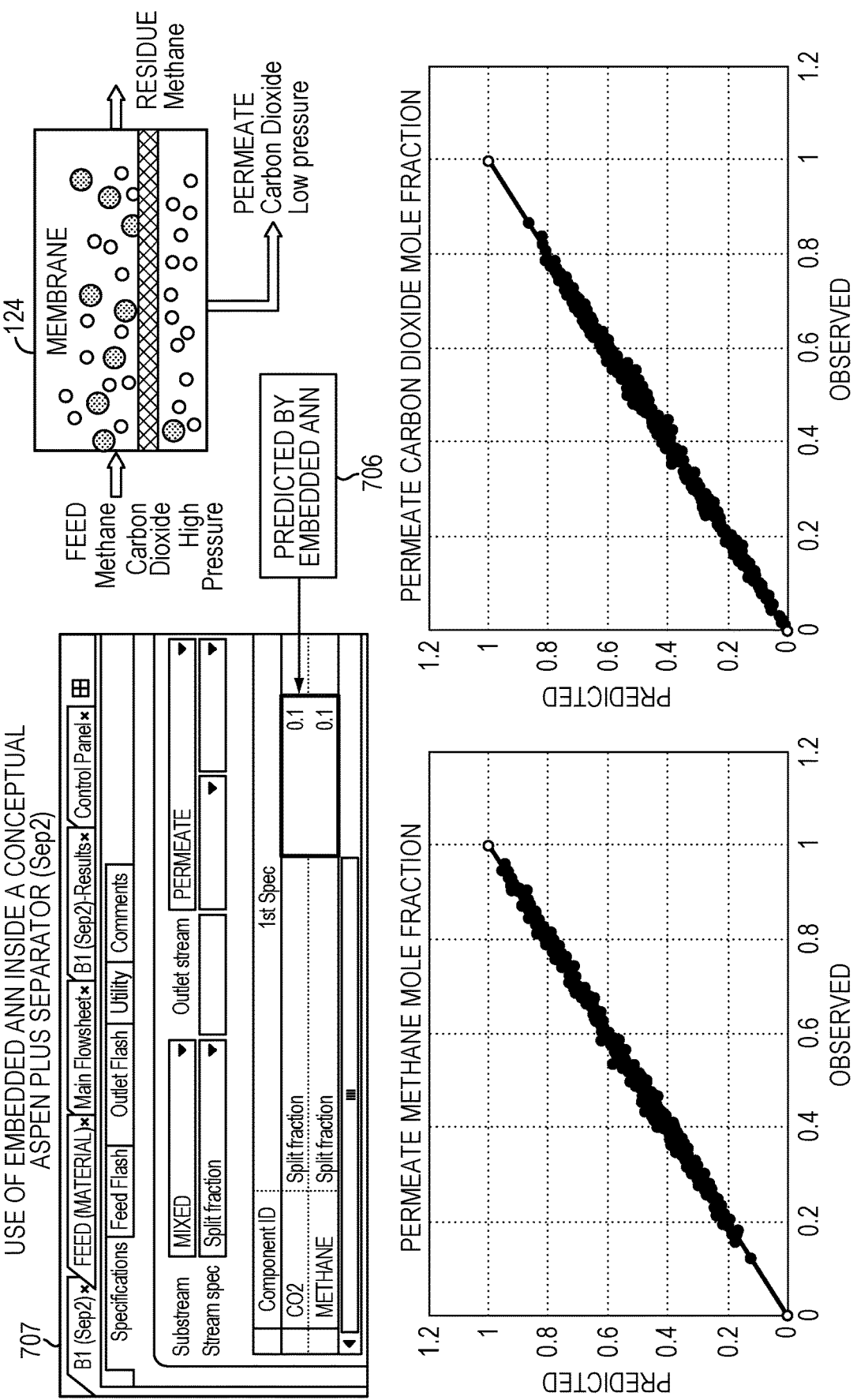
FIG. 11 is a graph of observed versus predicted separations for a membrane separation process for separating Carbon Dioxide from Methane when an embedded ANN is used within an Aspen Plus SEP2 block to calculate the separations in another example embodiment.

Turning to FIG. 11, an alternate application of Applicant's approach is demonstrated using an example of a hypothetical membrane separation process (chemical process 124 of interest) used to separate a mixture of carbon dioxide and methane. An ANN (machine learning model 706) embedded inside the Aspen Plus SEP2 block (simulation model 707) was trained using separation data generated using a rigorous membrane model in Aspen Custom Modeler (by Assignee-Applicant Aspen Technology, Inc.).

The graphs in the lower portion of FIG. 11 show the observed versus predicted mole fractions of methane and carbon dioxide in the permeate.

Generalization of Embedded Hybrid Model Approach in a Commercial Simulator

Figure 12:
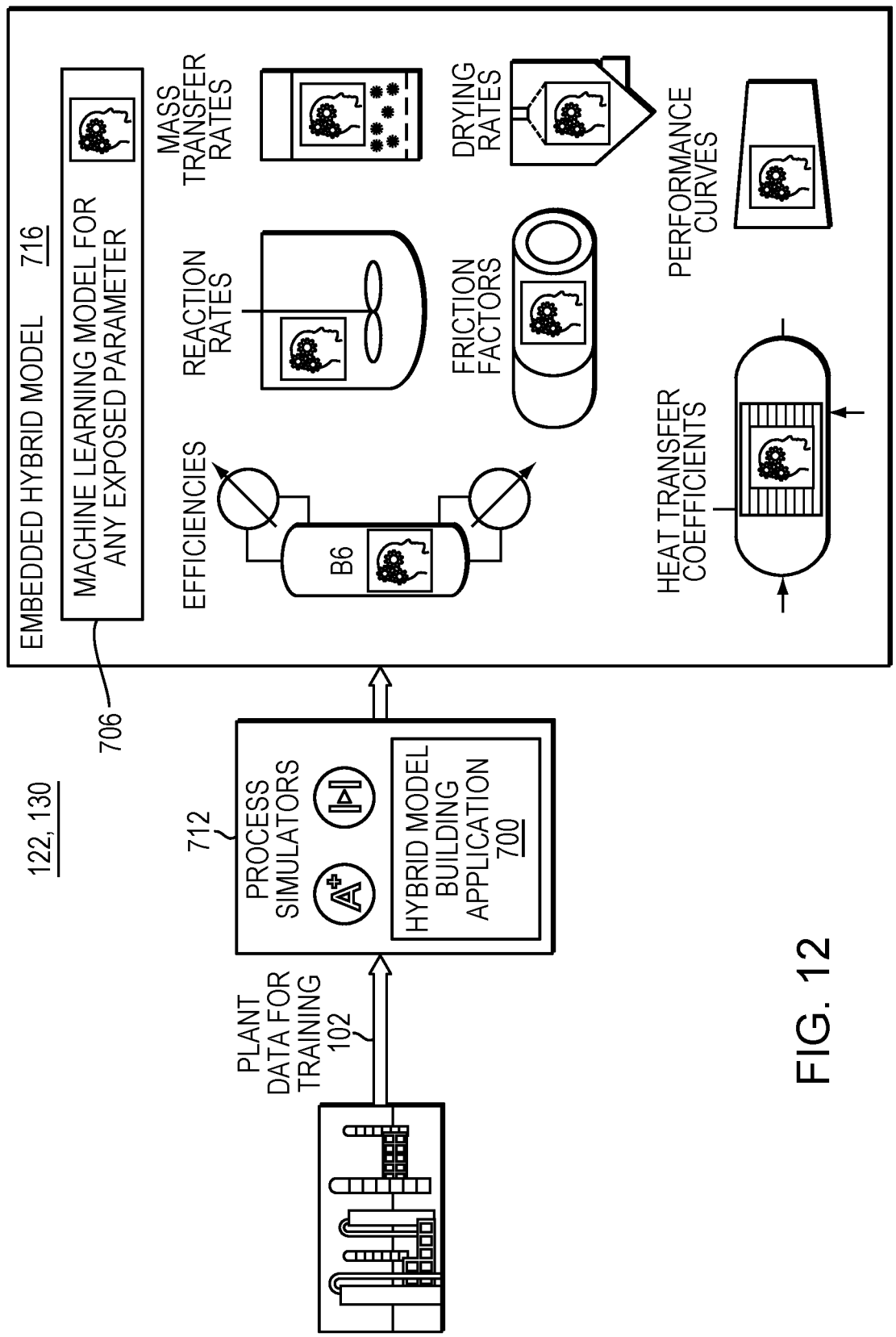
FIG. 12 is a schematic illustration of candidate utilization of embedded ANN in a general purpose commercial process simulator like Aspen Plus or Aspen HYSYS in embodiments.

As shown in FIG. 12, Applicant's method and system 700 of FIG. 7 can be integrated into a general purpose commercial process simulator 712 like Aspen Plus or Aspen HYSYS (by Assignee-Applicant Aspen Technology, Inc.). In particular, the hybrid model building techniques 700 are integrated into such general purpose simulators 712 to support seamless training and deployment of embedded machine learning models 706 inside existing simulation models for the following types of equipment (and respective chemical process of interest 124):

Calculation of heat transfer coefficient for a heat exchanger
Calculation of reaction rate parameter calculation for a reactor
Calculation of crystallization rate parameters for a crystallizer
Calculation of efficiencies for a distillation column
Calculation of drying rate parameters for a dryer
Calculation of friction factors for a fluid flow in a pipe This approach is flexible and the embedded machine learning model 706 is modified based on the extent of the available $1^{st}$ principles knowledge in embodiments.

For example, the embedded machine learning model 706 can predict (P values) for:

Reaction rates instead of reaction rate parameters if the reaction mechanism is not available
Heat transfer rates instead of heat transfer coefficients
Drying rates instead of drying rate parameters.

In turn, the resulting hybrid model 716 deployed in the process modeling system 130 more accurately determines settings for the controller 122 to control operation of the chemical process of interest and subject industrial plant. In addition, the improved model output 130 through a user interface (common or known in the industry) enables a process engineer to more accurately troubleshoot the chemical process of interest 124 offline. Similarly, the improved model output 130 may enable a process engineer or other to better detect bottlenecks of the chemical process 124 leading to improved debottlenecking of the chemical process. Likewise, the improved model output 130 enables optimizing performance of the chemical process at the subject industrial plant (offline or online) through plant system interfaces. In these ways, the inventive hybrid models 716/improved model output 130 enable improvements in the performance of the chemical process of interest 124 in process modeling and simulation embodiments.

Computer Support

Figure 13:
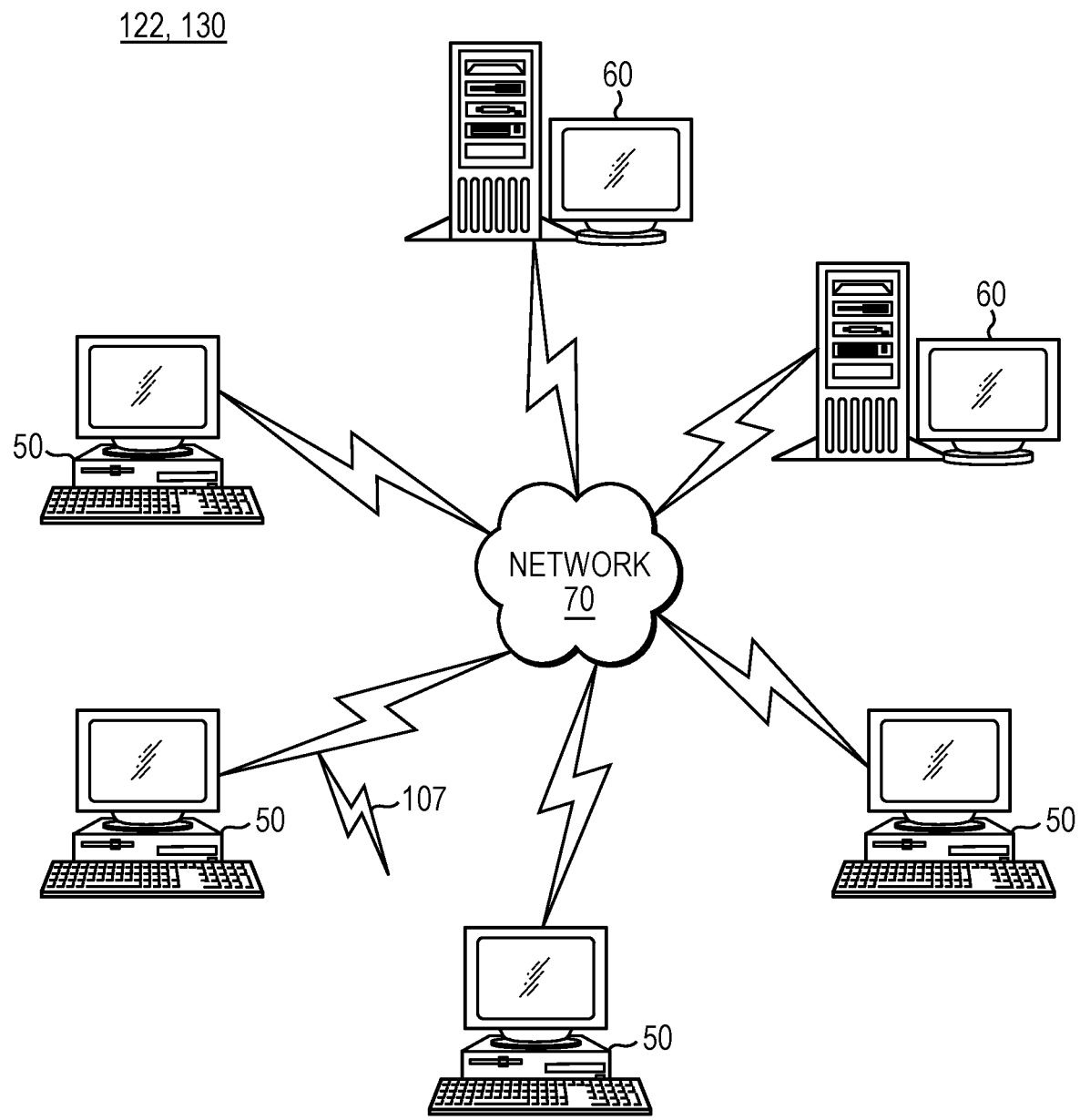
FIG. 13 is a schematic view of a computer network in which embodiments may be implemented.

FIG. 13 illustrates a computer network or similar digital processing environment in which process controllers (generally interfaces) 122 and process modeling systems 130 embodying the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), cloud computing servers or service, a worldwide collection of computers, Local area or Wide area networks, and gateways that currently use respective protocols (TCP/IP, Bluetooth, etc.) to communicate with one another. Other electronic device/computer network architectures are suitable.

Figure 14:
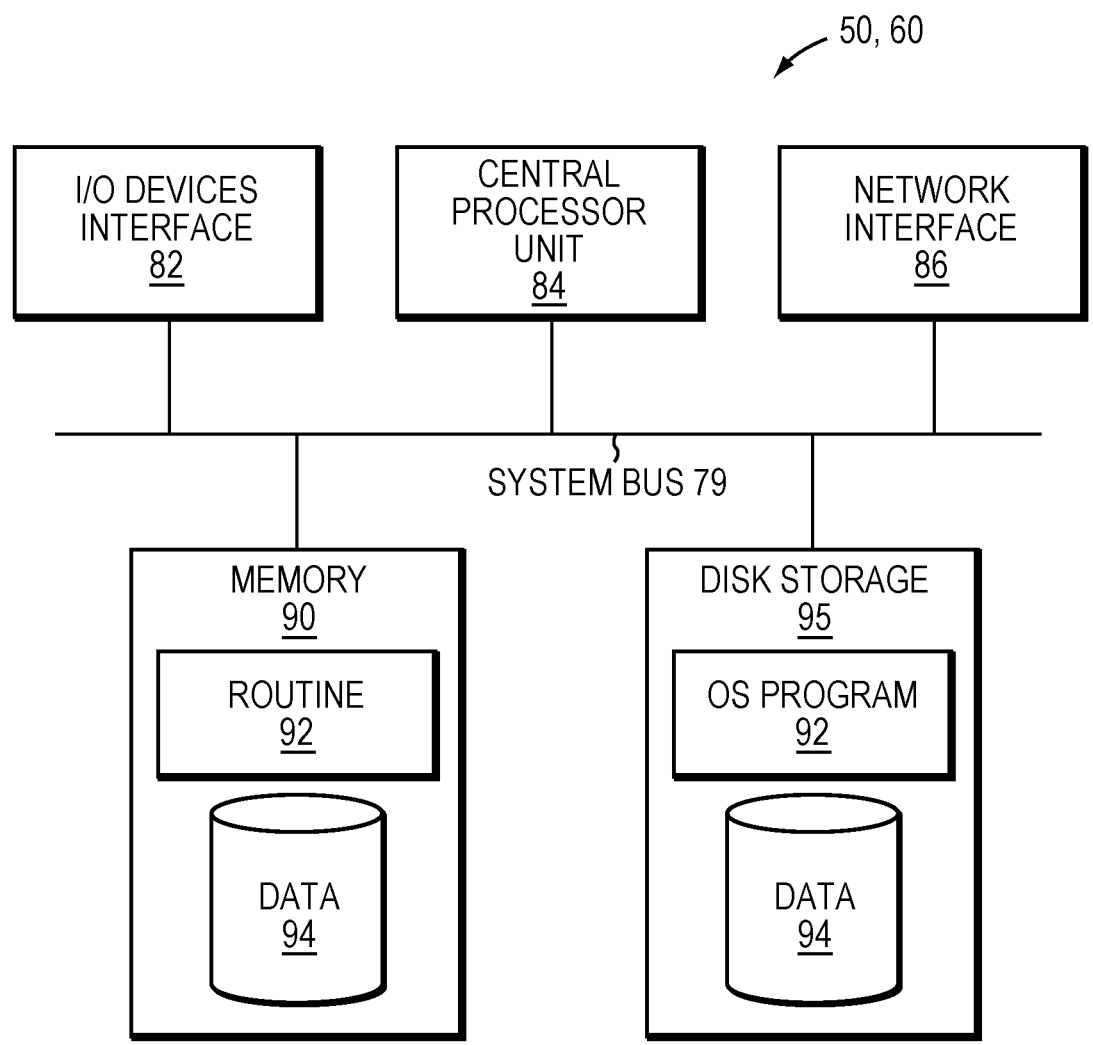
FIG. 14 is a block diagram of a computer node in the network of FIG. 13.

FIG. 14 is a diagram of the internal structure of a computer (e.g., client processor/device 50 or server computers 60) in the computer system of FIG. 13. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 13). Memory 90 provides volatile storage for computer software instructions 92 and data 94 used to implement an embodiment of the present invention (e.g., hybrid model building methods and systems 100, 500, 700, supporting machine learning models, first principles models, libraries, hybrid models 116, 516, 716, and related data structures and constructs detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

In other embodiments, the program product 92 may be implemented as a so called Software as a Service (SaaS), or other installation or communication supporting end-users.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

Computer-based methods and systems in process control, modeling, and simulation use a combination of first principles models and machine learning models to benefit where either model is lacking. In one example, input values (measurements) are adjusted by first principles techniques, and the adjusted values are used to train and generate a machine learning model of the chemical process of interest. In another example, a machine learning model represents the residual (delta) between a first principles model prediction and empirical/observed physical phenomena. Different machine learning models address different physical phenomena. A collection of residual machine learning models improves the accuracy of a first principles model of a chemical process of interest by correcting respective physical phenomena predictions. In yet another example, a machine learning model uses as input, measured values from the chemical process of interest. A first principles simulation model uses the process input data and machine learning predictions of parameters corresponding to specific phenomena. An error correction module determines the error between the simulated results and measured process output values (i.e., plant data). The determined error is used to further train the machine learning model improving predictions that are utilized by the first principles simulator.

Although the forgoing describes and details process control as one application technology area of embodiments of the present invention, there are other technology areas of utilization of Applicant's hybrid models and modeling method/system disclosed herein. Embodiments enable improvement in the performance of the chemical process of interest, such as by: enabling a process engineer to better troubleshoot the chemical process, enabling debottlenecking a portion of the chemical process at the industrial plant, and optimizing (online or offline) performance of the chemical process at the subject industrial plant. Embodiments include process modeling systems, process model simulation systems, and the like.

What is claimed is:

1. A computer-implemented method of process modeling and simulation, comprising:
   modeling a chemical process of a subject industrial plant, said modeling being by a processor and including
   generating a first principles model that predicts at least one variable of the chemical process of the subject industrial plant;
   receiving a dataset comprising of measured variables of the chemical process of the subject industrial plant;
   enriching the received dataset by adding at least one supplemental variable based on the first principles model;
   training, using the enriched dataset, a machine learning model to generate a hybrid model that predicts behavior of the chemical process;
   generating, using the trained machine learning model, a hybrid model; and
   based on predictions made by the generated hybrid model, automatically modifying settings of equipment of the subject industrial plant and enabling improvements in performance of the chemical process.

2. A method as claimed in claim 1 wherein the least one supplemental variable based on the first principles model is used to enhance an input variable in the received dataset, and values of the input variable are augmented in training and developing the machine learning model.

3. A method as claimed in claim 2 further comprising:
   generating a dataset of variables based on the first principles model that augment at least one of the measured variables in the received dataset, said generating resulting in augmented variables; and
   using the measured variables combined with the augmented variables in training the machine learning model, the trained machine learning model producing a corresponding output variable dataset with enhanced accuracy.

4. A method as claimed in claim 1 wherein the at least one supplemental variable is a measurement of a physical property of the chemical process, and the machine learning model prediction of the measurement of the physical property is used by the generated model instead of the first principles model prediction of the physical property.

5. A method as claimed in claim 4 further comprising:
   calculating a predicted value for output from a simulator, the first principles model forming the simulator; and
   training and developing the machine learning model to represent differences between observed output variable values from plant data and corresponding output variable values predicted by the simulator.

6. A method as claimed in claim 1 wherein the at least one supplemental variable is a computed error of an output variable of the first principles model relative to a measured output variable from the received dataset.

7. A method as claimed in claim 6 wherein the first principles model is a simulation model, and the method further comprises:
   calculating, with the machine learning model, an unmeasurable simulation model parameter or function value of the chemical process; and
   using the calculated model parameter or function value as an input into the simulation model.

8. A method as claimed in claim 1 wherein the generated hybrid model predicts any one or more of: operating conditions, physical properties, and output of the chemical process; and
   wherein the step of enabling improvements in performance of the chemical process include any of: enabling a process engineer to troubleshoot the chemical process, enabling debottlenecking a portion of the chemical process, and optimizing performance of the chemical process at the subject industrial plant.

9. A method as claimed in claim 1 wherein the step of enabling improvements in performance of the chemical process includes: based on predictions of progress of the chemical process made by the generated hybrid model, automatically controlling settings of equipment of the subject industrial plant.

10. A computer-based process modeling and simulation system, comprising:

a modeling subsystem configured to:
model a chemical process of a subject industrial plant, said modeling being by a processor and including generating a first principles model that predicts at least one variable of the chemical process of the subject industrial plant;
receive a dataset comprising of measured variables of the chemical process of the subject industrial plant;
enrich the received dataset by adding at least one supplemental variable based on the first principles model;
train, using the enriched dataset, a machine learning model to generate a hybrid model that predicts behavior of the chemical process; and
generate, using the trained machine learning model, a hybrid mode; and
a controller coupled to the modeling subsystem configured to automatically modify settings of equipment of the subject industrial plant based on predictions made by the generated hybrid model in a manner that enables improvements in performance of the chemical process at the subject industrial plant.

11. A system as claimed in claim 10 wherein the least one supplemental variable based on the first principles model is used to enhance an input variable in the received dataset, and values of the input variable are augmented in training and developing the machine learning model.

12. A system as claimed in claim 11 wherein the modeling sub system further:
generates a dataset of variables based on the first principles model that augment at least one of the measured variables in the received dataset, said generating resulting in augmented variables; and
uses the measured variables combined with the augmented variables in training the machine learning model, the trained machine learning model producing a corresponding output variable dataset with enhanced accuracy.

13. A system as claimed in claim 10 wherein the at least one supplemental variable is a measurement of a physical property of the chemical process, and the machine learning model prediction of the measurement of the physical property is used by the generated model instead of the first principles model prediction of the physical property.

14. A system as claimed in claim 13 wherein the modeling sub system further comprising:
calculates a predicted value for output from a simulator, the first principles model forming the simulator; and
trains and develops the machine learning model to represent differences between observed output variable values from plant data and corresponding output variable values predicted by the simulator.

15. A system as claimed in claim 10 wherein the at least one supplemental variable is a computed error of an output variable of the first principles model relative to a measured output variable from the received dataset.

16. A system as claimed in claim 15 wherein the first principles model is a simulation model, and the modeling subsystem further configured to:
calculate, with the machine learning mode, an unmeasurable simulation model parameter or function value of the chemical process; and
use the calculated model parameter or function value as an input into the simulation model.

17. A system as claimed in claim 10 wherein the generated hybrid model predicts any one or more of: operating conditions, physical properties, and output of the chemical process; and
wherein the interface enables improvements in performance of the chemical process by any of: enabling a process engineer to troubleshoot the chemical process, enabling debottlenecking a portion of the chemical process, and optimizing performance of the chemical process at the subject industrial plant.

18. A system as claimed in claim 10 wherein the interface includes a controller interface communicatively coupled to a controller of the subject industrial plant such that based on predictions of progress of the chemical process made by the generated model, the controller automatically controls settings of equipment of the subject industrial plant.

19. A computer program product, comprising:
A non-transitory computer readable medium having a memory area carrying computer code instructions embodying process modeling and simulation of a chemical process of interest in a subject industrial plant; and
the computer code instructions including instructions which when executed by one or more digital processors:
(a) model a chemical process of a subject industrial plant, said modeling being by a processor and including generating a first principles model that predicts at least one variable of the chemical process of the subject industrial plant;
(b) receive a dataset comprising of measured variables of the chemical process of the subject industrial plant,
(c) enrich the received dataset by adding at least one supplemental variable based on the first principles model,
(d) train, using the enriched dataset, a machine learning model to generate a hybrid model that predicts behavior of the chemical process,
(e) generate, using the trained machine learning model, a hybrid model, and
(f) based on predictions made by the generated hybrid model, automatically modify settings of equipment of the subject industrial plant and enable improvements in performance of the chemical process at the subject industrial plant.

20. A computer program product as claimed in claim 19 wherein the generated hybrid model predicts any one or more of: operating conditions, physical properties, and output of the chemical process; and
the computer code instructions further include instructions to a processor to implement process control by, based on predictions made by the generated model, automatically controlling settings of equipment of the subject industrial plant.

21. A computer program product as claimed in claim 19 wherein the generated hybrid model utilizes any of: (i) an input variable based on the received dataset, and values of the input variable are augmented in training and developing the machine learning model, (ii) a measurement of a physical property of the chemical process instead of a first principles model prediction of the physical property, and (iii) a quantitative representation of a physical property, derived using a machine learning model prediction, for which there is no known measurement in the received dataset.

22. A computer program product as claimed in claim 19 wherein the improvements in performance of the chemical process include any of: enabling a process engineer to troubleshoot the chemical process, debottlenecking a portion of the chemical process, and optimizing performance of the chemical process at the subject industrial plant.

\* \* \* \* \*

UNITED STATES PATENT AND TRADEMARK OFFICE
CERTIFICATE OF CORRECTION

PATENT NO. : 11,853,032 B2
APPLICATION NO. : 16/868183
DATED : December 26, 2023
INVENTOR(S) : Willie K. C. Chan et al.

It is certified that error appears in the above-identified patent and that said Letters Patent is hereby corrected as shown below:

In the Claims

In Column 19, Claim 12, Line 30, please delete "sub system" and insert -- subsystem --;

In Column 19, Claim 14, Line 48, please delete "sub system" and insert -- subsystem --.

Signed and Sealed this
Thirteenth Day of February, 2024

Katherine Kelly Vidal
*Director of the United States Patent and Trademark Office*